(12) United States Patent
Simpson et al.

(10) Patent No.: US 7,531,262 B1
(45) Date of Patent: May 12, 2009

(54) HIGH-VOLUME-MANUFACTURE FUEL CELL ARRANGEMENT AND METHOD FOR PRODUCTION THEREOF

(76) Inventors: Maria Simpson, 3151 W. Kilburn, Rochester Hills, MI (US) 48306;
Torrence L. Duffy, 4607 Pine Village Dr., West Bloomfield, MI (US) 48323;
Charles Simpson, 3151 W. Kilburn, Rochester Hills, MI (US) 48306

( * ) Notice: Subject to any disclaimer, the term of this patent is extended or adjusted under 35 U.S.C. 154(b) by 0 days.

(21) Appl. No.: 08/678,510

(22) Filed: Jul. 9, 1996

(51) Int. Cl.
*H01M 8/04* (2006.01)
*H01M 8/10* (2006.01)

(52) U.S. Cl. ............................. 429/32; 429/30; 429/34; 429/39

(58) Field of Classification Search .................. 429/34, 429/39, 30, 32, 33
See application file for complete search history.

(56) References Cited

U.S. PATENT DOCUMENTS

| | | | | |
|---|---|---|---|---|
| 3,554,803 | A | * | 1/1971 | Poirier .......................... 429/39 |
| 4,826,741 | A | * | 5/1989 | Aldhart et al. ............. 429/32 X |
| 5,350,642 | A | * | 9/1994 | Akagi .......................... 429/32 |
| 5,354,626 | A | * | 10/1994 | Kobayashi et al. |
| 5,419,980 | A | * | 5/1995 | Okamoto et al. .............. 429/32 |
| 5,447,805 | A | * | 9/1995 | Harats et al. |
| 5,858,567 | A | * | 1/1999 | Spear, Jr. et al. .......... 429/34 X |

* cited by examiner

*Primary Examiner*—John S Maples
(74) *Attorney, Agent, or Firm*—Cahn & Samuels, LLP

(57) ABSTRACT

A fuel cell which is producible in high volume has electrolyte, positive electrode and negative electrode components which incorporate structure, external electrical connections, internal fuel and oxidizer distribution and an exhaust passage to form a simple assembly which can be formed into a stack. The fuel cell can utilize either a rigid or a flexible electrolyte. The components are manufacturable by a process of printing rolled or flat stock, cutting where appropriate and stacking into a fuel cell assembly.

35 Claims, 22 Drawing Sheets

ONE POSSIBLE PROCESS, TEST AND ASSEMBLY SYSTEM FOR THE MANUFACTURABLE FUEL CELL

HIGH-VOLUME-MANUFACTURE FUEL CELL ARRANGEMENT AND METHOD FOR PRODUCTION THEREOF

BACKGROUND AND SUMMARY OF THE INVENTION

The present invention relates to a fuel cell and a manufacturing method therefor. More particularly, the present invention relates to a fuel cell arrangement which is practicably capable, for the first time, of being manufactured in high volume at relatively low cost, and to a high volume process which provides robust and dependable fuel cell construction.

Experimental fuel cells were first produced in the mid-1800's as research expanded in electrochemical storage devices. That early work lead to present-day storage batteries which have, however, progressed relatively little over the past hundred years. When NASA needed a compact, efficient electrical generating system in the 1960's for the U.S. space program, the fuel cell became the energy storage device of choice because cost was not a primary factor.

Generally speaking, fuel cells and storage batteries both produce electricity in essentially the same manner. That is, their oxidizing material (fuel) at a source electrode (cathode) produces positive ions, and reducing material (oxidizer) at the return electrode (anode) produces negative ions. These positive and negative ions combine in an electrolyte forming new stable materials and completing the electrical path.

A battery's source of fuel and oxidizer are the electrode materials which, when depleted, render it inoperative. The electrodes in a fuel cell are, however, permanent structures which provide an electrical path and contribute nothing to the chemical activity. Catalysts initiate the oxidation process which is maintained as the fuel and oxidizer are replenished from external sources. Most present-day fuel cells use hydrogen as the fuel and air as the oxidizer.

An atomic-level, hydrogen permissible filter (Proton Exchange Membrane or PEM) greatly simplifies a fuel cell's structure. In the PEM fuel cell, a hydrogen-rich fluid is fed to the negative electrode (cathode) side of the PEM where a catalyst causes hydrogen atoms to separate from the surrounding fluid material as the electrons of the separated hydrogen atoms are surrendered to the negative electrode prior to passing through the PEM. The oxygen in the air gains electrons through catalytic activity at the positive electrode (anode) side of the PEM. The hydrogen and oxygen atoms (ions) combine, completing the cycle and the resultant is expelled.

The PEM in many fuel cell systems is a thin plastic film commercially available, for example, from DuPont and Gore Industries and similar in handling characteristics to plastic food wrap. Many mechanical difficulties are thus associated with this "plastic wrap"-type PEM. A complex, costly, physical supporting structure is required, including both fuel and cooling-fluid routing.

Electrolyte, PEM and separator treatment demand precision handling which makes final assembly extremely difficult. The process of sealing and connecting the cell stack is the most demanding because the PEM and separator are sensitive to both fluid-wetting and high temperatures. Noble-metal catalysts and easily damaged carbon-compound electrodes contribute significantly to costs, due both to high-priced material and yield losses. The final difficulty is the assembly and sealing of the cells because joining temperatures and pressure must be kept extremely low to avoid destroying the components.

The use of fuel cells for automobiles presents another tremendous challenge. For example, a minimum life expectancy for a family vehicle with only routine maintenance is 100,000 miles over a 5-year span. An automobile must start and operate under a wide variety of adverse conditions, and the drive package must be compact enough to allow placement conveniently away from the passenger compartment and yet be readily accessible for maintenance. The drive package must work safely and start quickly even when abused or slightly damaged. Moreover, there must be compliance with stringent emission standards. From an economic perspective, fuel cells have to compete with current drive-train technology and component replacement, rather than complete-system replacement, is essential.

A tremendous amount of research and development has been devoted to automotive fuel cells. However, prior to the present invention, such R & D has failed thus far to produce economical practicable fuel cell products, because it has concentrated largely on the fundamental scientific principles and basic developments such as perfluorosulfonic-acid based PEMs. On one hand, observed current densities for PEM cells vary from around 25 mA/cm$^2$ to 4000 mA/cm$^2$. On the other hand, achieving such current densities has generally involved using graphite as the conductive electrode material.

Carbon's natural clumping and granular structure present a large porous surface area lattice through which fuel and oxidizer flow. If this large surface area is treated with catalyst material after forming the carbon electrode, large amounts of nobel metal are used. If the carbon is blended with the catalyst and bonding agents prior to forming or attaching as an electrode, the electrical resistance increases. Because of the already-high internal resistance of carbon, any external resistance created at the interface substantially increases the energy loss as heat.

Furthermore, the assembly of PEM electrolyte and carbon electrode cells into usable stacks has proved difficult from the viewpoint of the electrical connections, the fluid seals, and the structure to keep it in place. Also, PEMs rapidly deteriorate as the temperature approaches 90° C. Separate cooling components and complex hydration systems which have been acceptable in the lab are certainly less so in the commercial world. Ceramic electrolyte development has been curtailed due to the perception of high cost and production difficulties.

We have recognized that a key requirement of fuel cells, particularly for automotive applications where cost is a major factor, is that they be mass producible but of consistent high quality, characteristics heretofore unavailable with conventional fuel cells.

In accordance with the present invention, fuel cell fabrication, process and assembly methods are disclosed with the objective of advantageously eliminating many of the components and most of the costly process steps of conventional fuel cell fabrication in order to substantially reduce costs and increase manufacturability without sacrificing the advantages of currently used fuel cells.

Another object of the present invention is to provide a fuel cell in which the mechanical structure, frame and closure is an integral part of the components, and most particularly, the electrodes for use with flexible electrolytes.

Still another object of the present invention is to provide a fuel cell in which the cell-to-cell passages for the fluid inputs and outputs are integrated.

Yet another object of this invention is to provide a fuel cell in which the electrolyte can be placed on either side of the electrode which allows alternate assembly of the electrodes with the electrolytes, negative electrode, electrolyte, positive electrode, electrolyte, negative electrode, etc., and therefore reduces to about one half plus one the number of electrodes needed in current stacked or tandem fuel cells.

Another object of this invention is to provide a fuel cell in which the number of separator plates is reduced for flexible or otherwise difficult to maintain electrolytes or completely eliminated, for rigid structural electrolytes.

Another object of the present invention is the provision of a fuel cell in which the seal or closure at all passages, enclosures, vias and surrounds can be accomplished simultaneously and in any of the known methods such as compressible formed material, adhesives, chemical bonding, eutectic and metal bonding etc.

Another object of this invention is to provide a fuel cell in which the catalytic material can be applied directly to either the electrolyte or the electrode structures using the most inexpensive and reliable known methods such as sputtering, selective plating, chemical vapor deposition, printing etc.

Still another object of the present invention is the provision of a fuel cell in which the electrode electrical connections are externally selectable and connectable to establish the desired electrical power output from interconnected cells.

A further object of this invention is the provision of a fuel cell in which the component alignment advantageously occurs by mechanical design.

A yet further object of this invention is the provision of a fuel cell in which the electrodes are formed equally well by any of several known methods, such as stamping, sintering, casting, molding and multi-layer laminating and etching similar to circuit board technology.

Another object of this invention is the provision of a fuel cell in which the ionization of the fuel and oxidizer is accomplished either at the electrolyte face for cell simplicity or moved some distance to enhance the chemical process and expellation of the spent reaction.

The foregoing objectives for producing, in high volume, fuel cell components which incorporate structure, external electrical connection, internal fuel and oxidizer passage and distribution, exhaust passage and outlet and simple stack alignment assembly have been achieved according to one embodiment in the form of three singular, unitized fuel cell components, namely an electrolyte, a positive electrode and a negative electrode, are complete and ready for stacking, seal or joinery at the exit of their simple process lines. Each of the components works with all of the known electrochemical and electrolyte processes. These components can be stacked to form a complete, alignable, repeatable fuel cell module with internal oxidizer and fuel passage and distribution, internal exhaust passages and external electrical interconnect.

A further object of the present invention is to overcome the current difficulties of electrical interconnect, structural integrity, fuel and oxidizer distribution, maintenance and replacement while produced by a high speed, high volume process such as stamping for metals and suitable plastics and rotary die forming for partially staged ceramics and thermal set polymers.

In one embodiment of the present invention, the electrolyte is produced from a single piece of inert structural material which is processed to allow the passage of only migrating ions, and to which conductive material and the appropriate catalysts are applied to each side to provide a single inclusive unit, i.e. electrolyte, and positive and negative electrodes. Non-conductive fuel and oxidizer distribution plates are added to complete the cell.

The electrolyte is configured such that the main structural component is a peripheral surround of the processing area which is impermeable, includes external electrical connecting tabs, and provides an attachment and seal or closure area. Seal areas are also provided at strategic internal locations for inter-cell fluid passages. The large operating area of the electrolyte is processed to be ion permissive and provides attachment surfaces for conductive electrode and catalytic materials.

In yet another embodiment, the electrode is produced from a single piece of electrically conductive material such that the principal structural component is a peripheral surround of the processing area which is impermeable, includes external electrical connecting tabs and provides an attachment and seal area. Seal areas are also provided at strategic internal locations for inter-cell fluid passages. The large operating area of the electrode is permeable or otherwise open to fluid flow in all directions, transverse, radial and lateral and provides an attachment surface for a catalytic material.

The differences between the positive and negative electrodes are in the location and/or shape of the external electrical connectors and, if applied, specific catalysts. Although it is not necessary to attach the catalysts to the electrode structures, this ability to do so allows the use of less robust mechanical electrolytes which could not support attachment of catalysts to them. The electrodes are configured to have electrolytes placed on either side thereof and reduce volume while increasing fuel cell efficiency.

In yet another embodiment, the electrode is produced from three pieces of material which are separately formed and then joined together to form a unitized structure. The two active pieces are identical, interchangeable, reversible, and are formed and configured by the same processes. Each of the active pieces are produced from a single electrically conductive material such that the principle structural component is a peripheral surround of the processing area which is impermeable, includes external electrical connecting tabs and provides an attachment and seal (closure) area. Seal (closure) areas are also provided at strategic internal locations for inter-cell fluid passages.

The third piece is a distribution plate produced from either a single electrically conductive material which joins the active pieces, thereby producing a common level electrode, or from a single non-conductive material which separates the two active pieces producing two electrically separate electrodes. The distribution plate has a principle structural component constituting a peripheral surround of the processing area which is impermeable, may include external electrical connecting tabs and provides an attachment and seal (closure) area. Seal (closure) areas are also provided at strategic internal locations for inter-cell fluid passages.

In a yet further embodiment, the electrolyte is produced from a single piece of inert non-structural material which is processed to allow the passage of migrating ions in specified regions. The electrolyte is attached directly to one or both of the electrodes as described in the second and third embodiments herein. In one instance the associated catalysts are applied directly to each electrode structure and the non-structural electrolyte attached to one side thereof and a non-conductive alternative or optional seal placed between the electrolyte and electrode assembly and the remaining electrode to complete the cell.

A first modification of the last-mentioned embodiment is the attachment of a non-conductive seal to the non-structural electrolyte. The electrolyte and seal assembly is placed between the appropriate electrodes to complete the cell. In a second modification, the catalysts together with a conductive material are applied directly to each side of the non-structural electrolyte. The electrodes are fabricated with a closed peripheral raised shelf to which is applied a conductive material compatible with those on the electrolyte. This shelf becomes the electrical interface with the conductive catalysts applied to the electrolyte. The electrolyte can be attached to one of the electrodes with the electrode shelf in contact with the associated conductive catalyst. A non-conductive seal is placed between the previously attached electrolyte to electrode and the remaining electrode, with the remaining electrode shelf in contact with the not attached side electrolyte conductive catalyst, thus completing the cell.

Yet another variation is the attachment of a non-conductive seal to the appropriately catalyzed nonstructural solid electrolyte. The electrolyte and seal plate assembly is placed between the appropriate electrodes, with the electrode shelves in contact with the conductive catalysts of the electrolyte to complete the cell.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Although the drawings show a co-annular arrangement of the fuel and air feeds, it is to be understood that the hereinafter fuel and air feeds 42, 43 can also be offset from one another on the z-axis and function efficiently in those situations where greater separation between fuel and oxidizer is desired.

Figure 1:
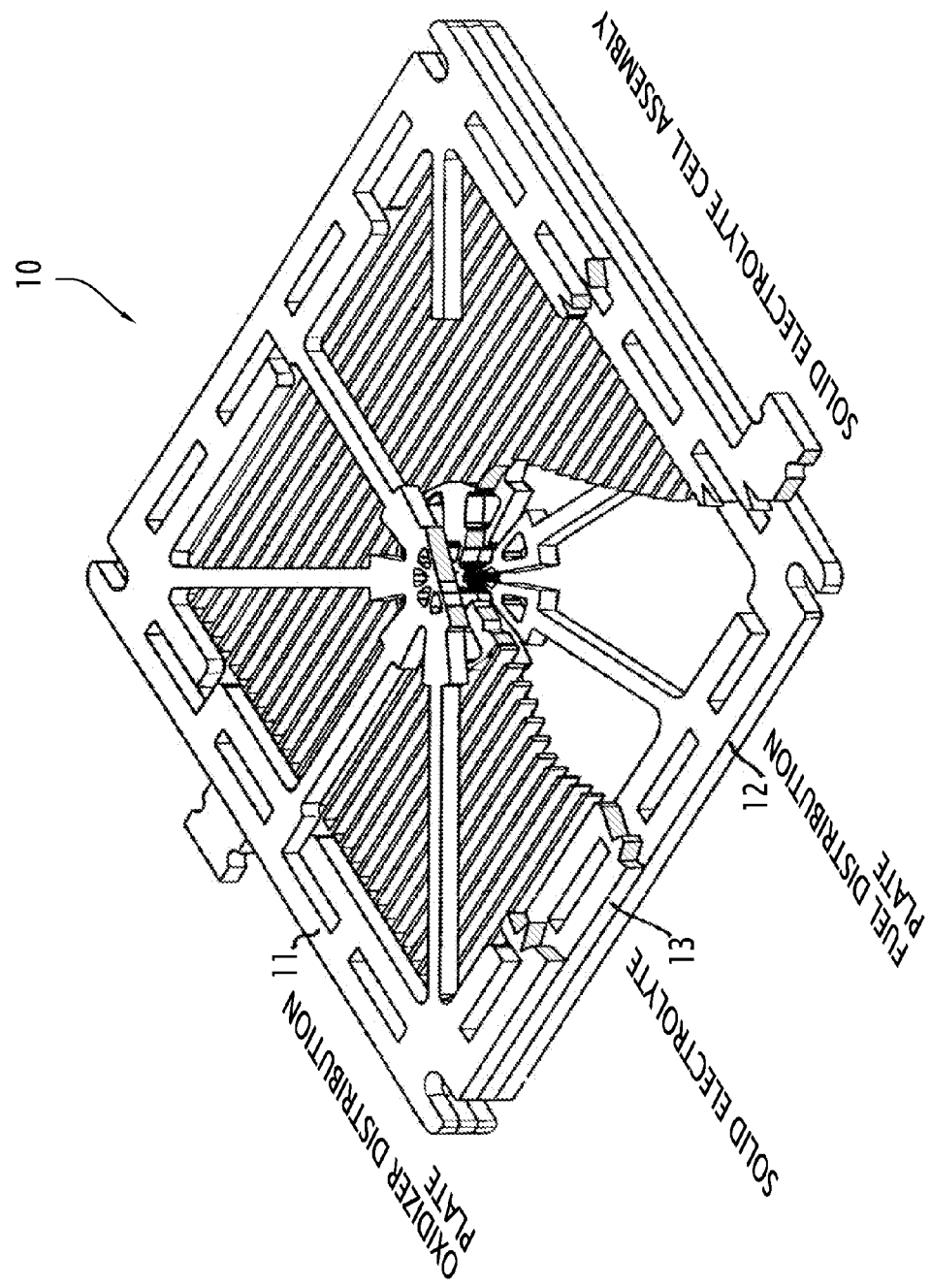
FIG. 1 is a perspective, partially sectioned assembly view of a first embodiment of a solid electrolyte fuel cell in accordance with the present invention with negative and positive electrodes and catalysts applied on respective opposite sides of a structural solid electrolyte which incorporates external electrical connection, fuel and oxidizer passages, returns and exhausts with the fuel and oxidizer passage, and distribution plates themselves being structural components whose geometry matches that of the electrolyte to complete the cell assembly.
Figure 2:
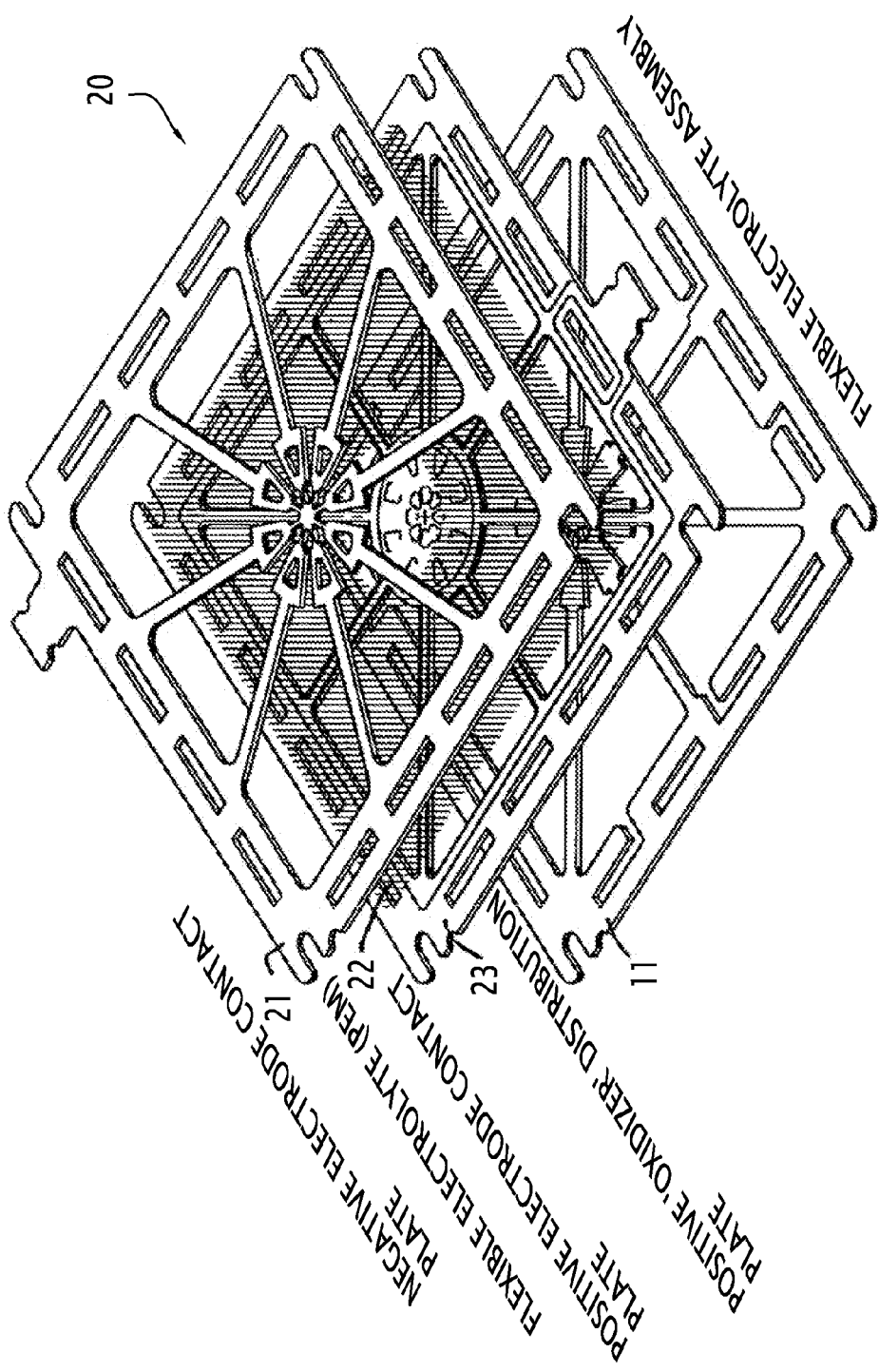
FIG. 2 is an exploded perspective view of a flexible electrolyte fuel cell assembly comprising another embodiment according to the present invention which shows formed structural electrode contact plates attached directly to a flexible electrolyte having positive and negative conductive catalysts applied to the top and bottom, respectively, an oxidizer distribution plate, arranged on the side adjacent to the positive electrode contact plate, and a fuel distribution plate being on the side adjacent to the negative electrode contact plate as shown in FIG. 19, to form a complete, alignable, repeatable fuel cell module with internal oxidizer and fuel passage and distribution, internal exhaust passages and external electrical interconnect, the distribution plates being either permanently joined to or left independent of membrane-electrode assembly for ease of fuel cell disassembly and maintenance.
Figure 3:
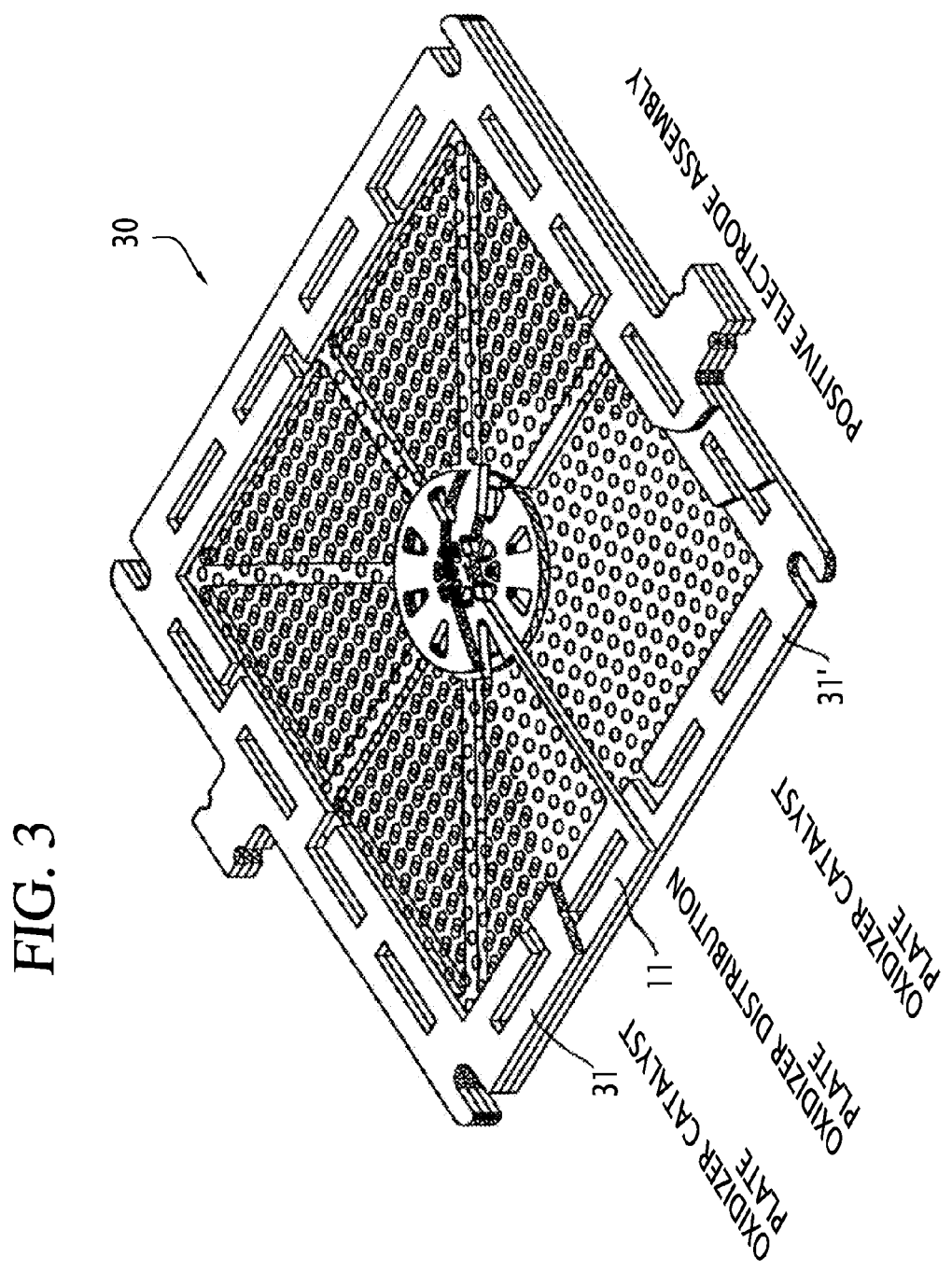
FIG. 3 is a perspective, partially sectioned view of a positive electrode assembly in accordance with the present invention in which a multiple part joined or laminated positive electrode is constructed by stacking an oxidizer distribution plate with oxidizer catalysts plates above and below in which the oxidizer catalyst plates are micro-stamped panels which are themselves made of conductive material or are conductive coated and to which the catalyst is applied and in which each of the electrode components share the same geometry.

FIGS. 1, 2, and 3 illustrate embodiments of the present invention in which a single relatively compact unitary frame structure is provided with vias and ports for inter-cell fluid passage, fluid distribution, presentation of catalysts, support for the electrolytes, external electrical connections and interlock guides to simplify cell assembly. Each of the components described herein is specifically configured to be fabricated by conventional high-volume, high-speed operations such as stamping for metals and suitable plastics, and rotary die forming of partially staged materials such as ceramics or thermal set polymers similar to the manner in which conventional wheels or baked cookies are formed.

FIG. 1 shows the simplest solid electrolyte cell assembly of the present invention designated generally by numeral 10 in which an oxidizer distribution plate 11 (see also FIG. 8) and a fuel distribution plate 12 (see also FIG. 10) are assembled on either side of a rigid solid electrolyte 13—shown partially broken away—(see the complete rigid solid electrolyte shown isolated in FIG. 15) to which a positive electrode is applied on one side, and a negative electrode to the other side. Thereafter, each the prepared components are assembled together and joined by methods described herein.

FIG. 2 shows a flexible electrolyte cell assembly of the present invention in which the components designated generally by numeral 20 are fabricated, prepared and joined by methods described herein. These components include a negative electrode contact plate 21 (see FIG. 17), a flexible electrolyte (PEM) 22 (see FIG. 11), an electrode contact plate 23 (see FIG. 16) and a positive "oxidizer" distribution plate 11 (see again FIG. 8). Throughout the description identical parts in different embodiments will continue to be designated by the same numerals.

FIG. 3 shows how the components of a positive (or negative) electrode assembly designated generally by numeral 30 are fabricated, prepared and joined by methods described herein. That is, the assembly 30 comprises an oxidizer catalyst plate 31, 31' (see also FIG. 7) stacked above and below the oxidizer distribution plate 11 (see again FIG. 8). The plates 31, 31' may also include a catalyst and oxidizer passage area 32, 33 held (see FIG. 7).

Figure 4:
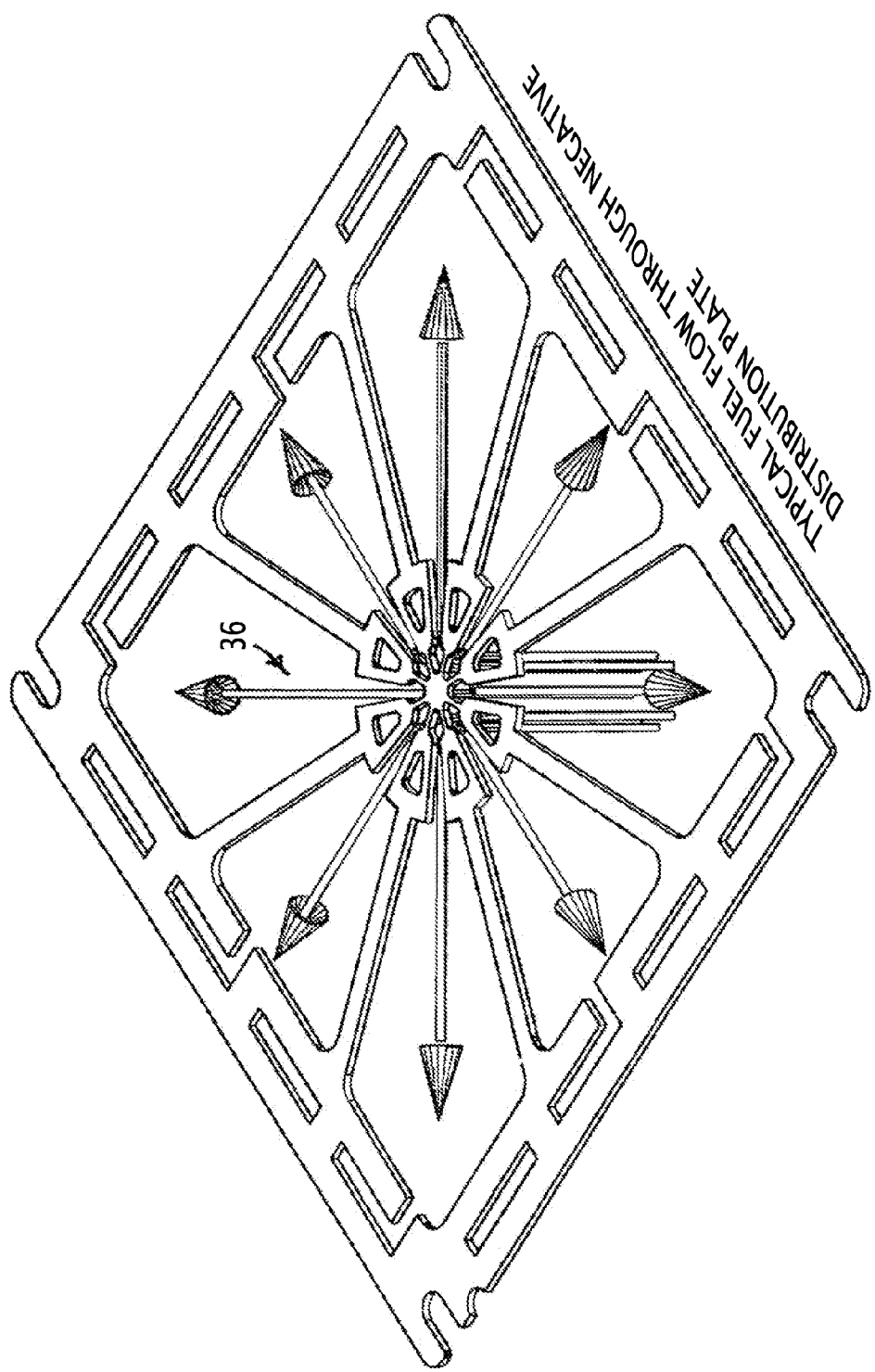
FIG. 4 is a perspective view showing fuel flow within the fuel cell to demonstrate a unique internal central feed of the present invention.

FIG. 4 shows the internal radially-outward flow pattern 36 of the fuel through the internal central feed of a fuel distribution plate of the fuel cell configuration in accordance with the present invention. Both the fuel and oxidizer are feed from the center and removed, when needed by certain hydrogen rich fuels or exhausted product from the oxidization process. As noted at the outset, the drawings show a co-annular arrangement of the fuel and air feeds; however, they can also be offset from one another on the z-axis and function more efficiently in those instances where greater separation between fuel and oxidizer is deemed appropriate.

Figure 5:
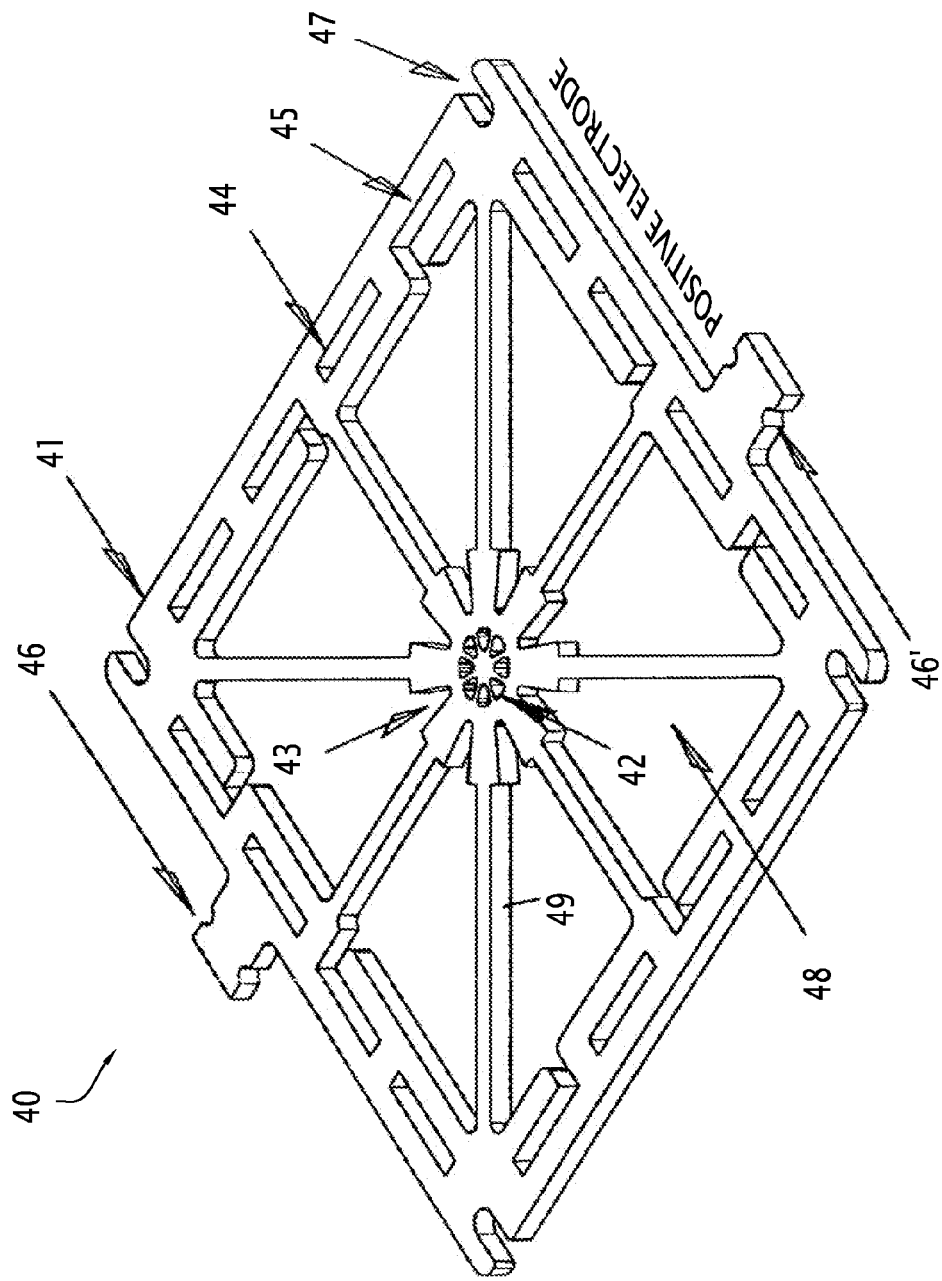
FIG. 5 is a perspective view of one embodiment of a positive electrode which can be used in constructing a fuel cell in accordance with the present invention.

FIG. 5 exemplifies the flexibility embodied in the "unit" approach of the present invention in that the illustrated positive electrodes designated generally by numeral 40. The electrode 40 is produced as a single plate piece by stamping, molding or casting with a solid surround and seal area 41. Vias or conduits 42 are provided in the electrode plate for the plate-to-plate passage of fuel, as seen in FIG. 4, as well as vias or conduits 43 for oxidizer and oxidizer inlet to the fuel cell. Fuel vias 44 and exhaust vias 45 are provided for plate-to-plate passages and openings to the oxidizer exhaust vias. Electrical connecting tabs 46, 46' are formed integral to the plate and thus require no additional processing. Inclusion of alignment, assembly and clamp structure 47 in the electrode plate reduces complexity and produces a strong structure for the associated cell.

Figure 19:
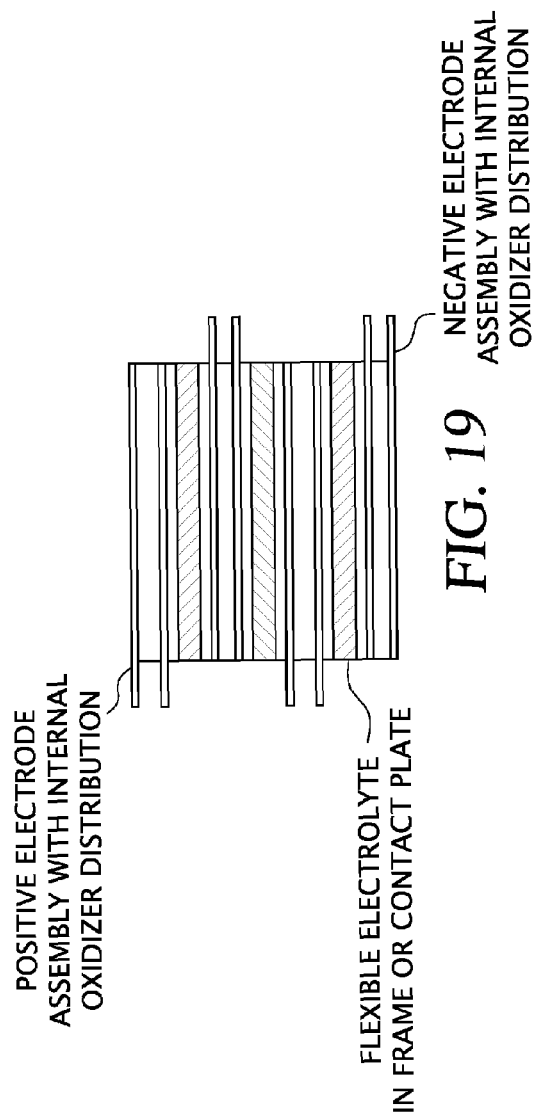
FIG. 19 is a view similar to FIG. 18 but showing a fuel cell stack assembly utilizing a flexible electrolyte system, also known as a flexible electrolyte stack.

The largest area 48 of the plate 40 is dedicated to the distribution of the oxidizer to the electrolyte i.e., the working area of the fuel cell 40, and is permissive to the passage of the oxidizer while allowing the plate to remain structurally solid and sound due to the cross- and diagonal members 49. The working area 48 is produced as part of the plate by stamping corrugations and holes, molding or casting the plate with variegations and holes, or sintering materials. The plate may be produced from conductive materials which reduces the number of process steps or from non-conductive materials to which conductive materials are applied by coating, printing, plating, sputtering or other known means, thereby reducing material costs. The entire working surface may be overlaid with the catalyst by coating, printing, plating, sputtering or other suitable means. The surface where the components are intended to be attached to one another can be prepared by printing, selective coating, selective plating or other means for joining by brazing, eutectic wetting, plate bonding or other known means. The positive electrode 40 may be stacked with a solid electrolyte and a negative electrode 50' to form a complete fuel cell. The electrodes are configured to have electrolytes on either side thereof as shown in FIG. 19.

Figure 6A:
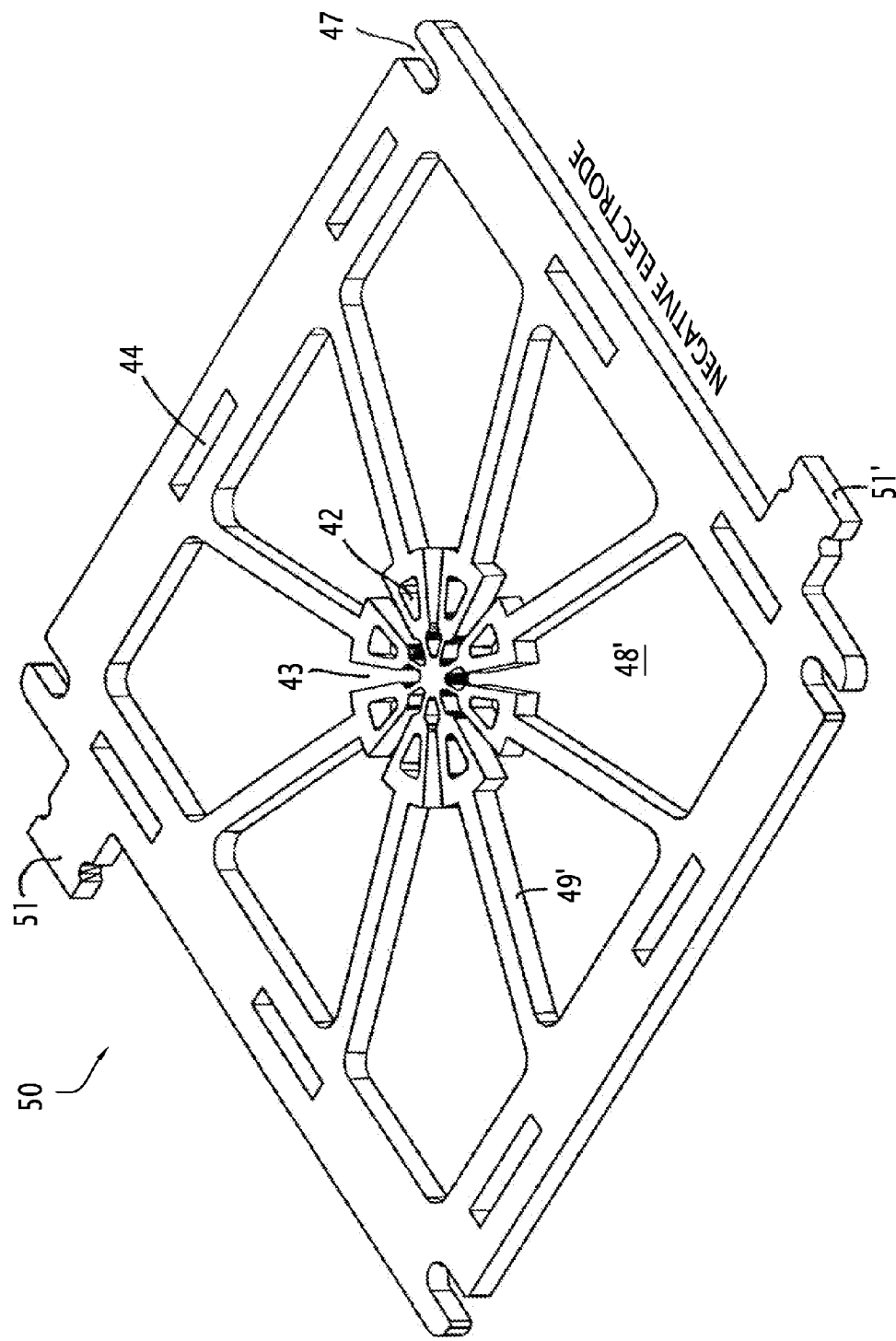
FIG. 6A is a perspective view of one embodiment of a negative electrode without fuel return passages which can be used in constructing a fuel cell in accordance with the present invention.

FIG. 6A shows a negative electrode plate designated generally by numeral 50 in which the fuel is completely used and which has a congruent configuration, including vias 42, 43, passages 44, lugs 51, 51' and structure 47 with the associated cell components, e.g. the positive electrode plate of FIG. 5 which thereby allows the individual components to be stacked. The main differences are the working area where the fuel is presented to the electrolyte 48', the openings 43 to the fuel vias, the absence of the fuel return passages 45 shown in FIG. 5 due to the total use of fuel and a different position for the electrical connecting tabs 51, 51', to distinguish them from the positive connecting tabs.

Figure 6B:
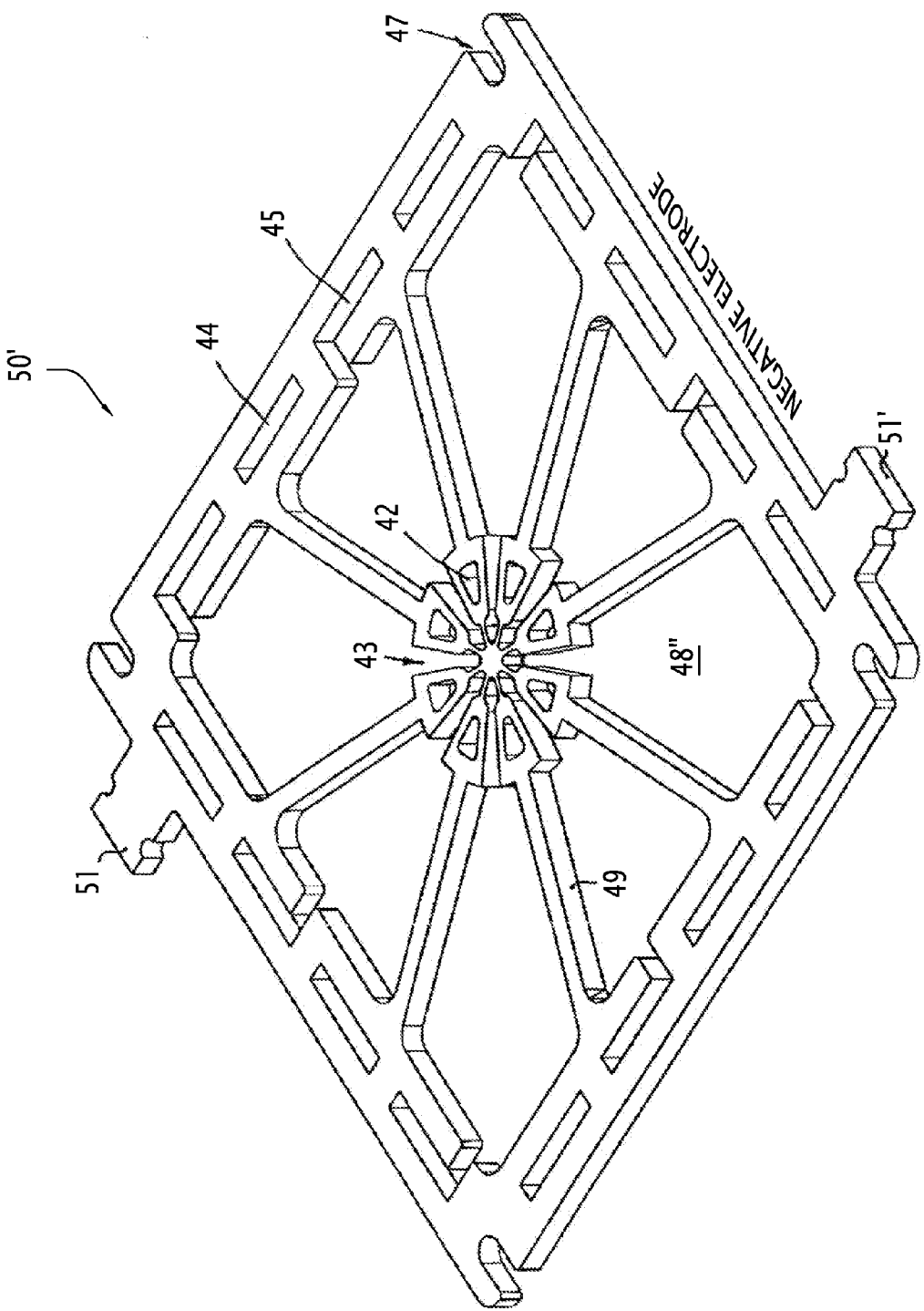
FIG. 6B is a perspective view of another embodiment of a negative electrode with fuel return passages.

FIG. 6B is similar to FIG. 6A but shows a negative electrode plate designated generally by numeral 50' for a hydrogen-rich fuel which is therefore returned to the source. Like plate 50, the negative electrode 50' is congruent in substantial details, i.e. configuration, vias 42, 43, passages 44, 45 and structure 47 with the associated cell components which allows individual components to be stacked. The differences are in the working area 48" where the fuel is presented to the electrolyte, openings to the fuel vias 42, 43, and electrical connecting tabs 51, 51' which are distinguished from the connecting tabs 46, 46' of the positive electrodes (FIG. 5) by being in a different position.

Figure 7:
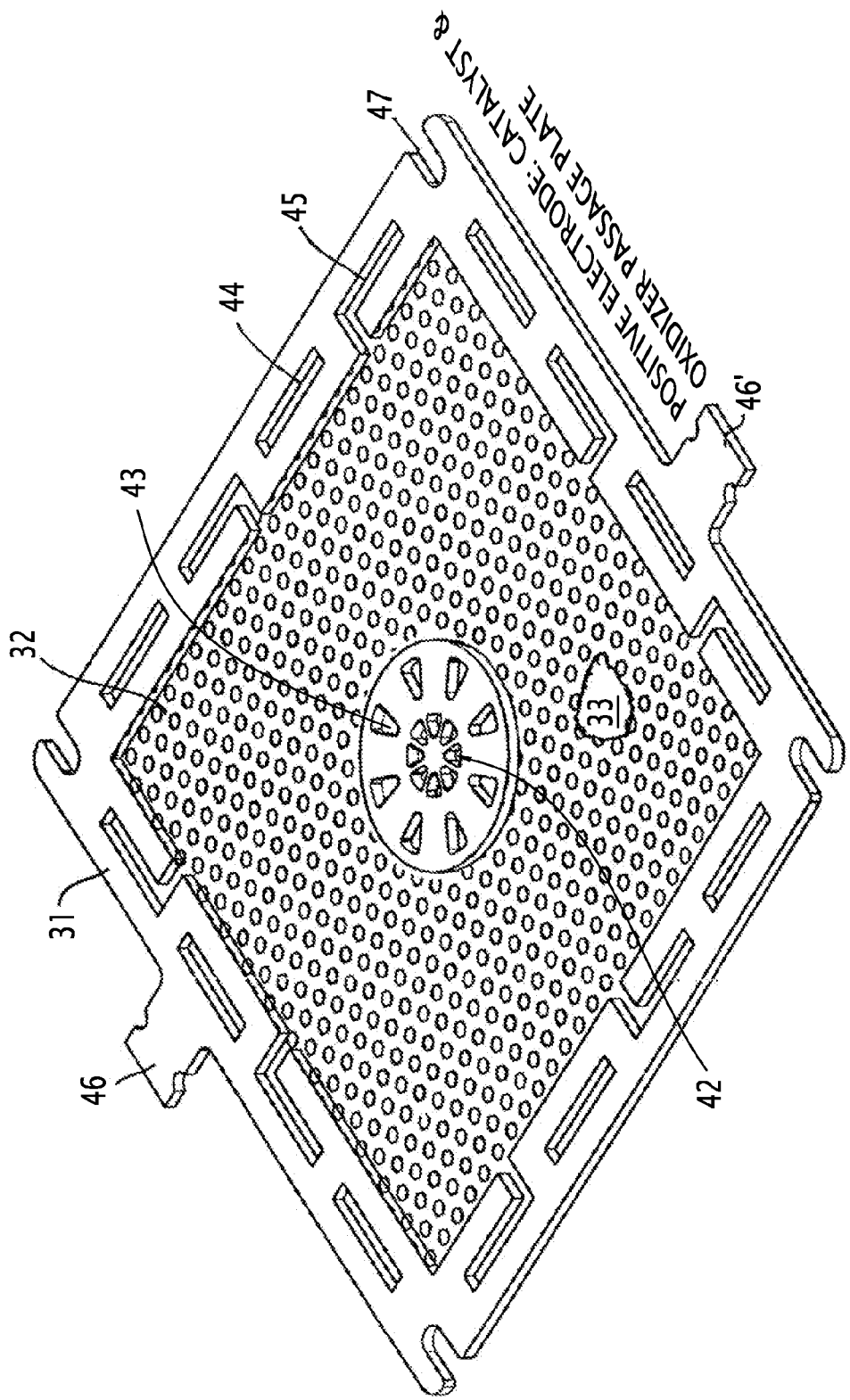
FIG. 7 is a perspective view of one embodiment of a catalyst and oxidizer passage plate of a multiple part joined or laminated positive electrode assembly for a fuel cell of the present invention.
Figure 8:
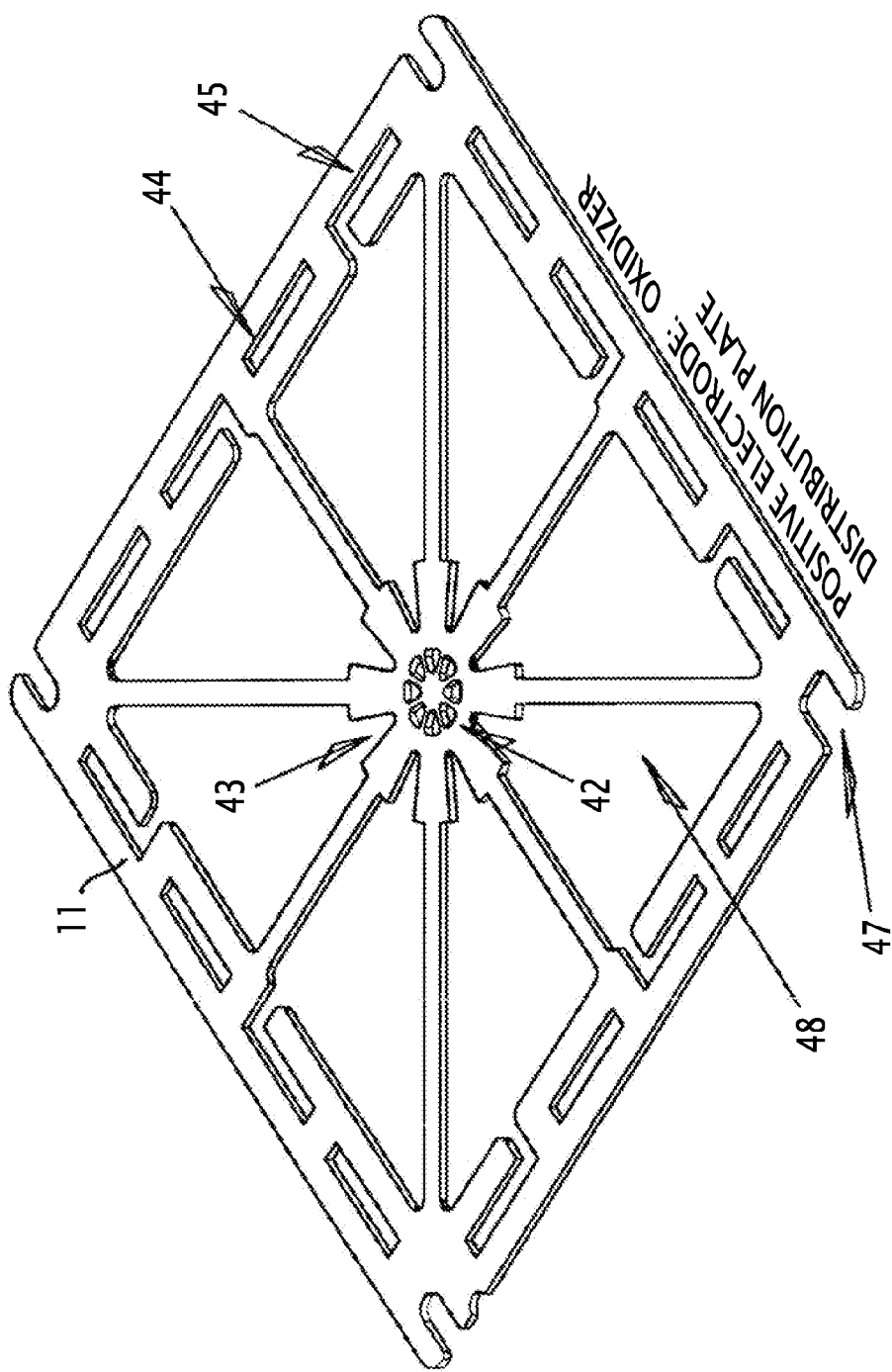
FIG. 8 is an isolated perspective view of an electrode oxidizer distribution plate shown in FIGS. 1, 2, 3 and 18.

FIG. 7 shows an oxidizer passage plate which is used in combination with the oxidizer distribution plate 11 of FIG. 8 and another oxidizer passage plate and form a complete positive electrode in the manner shown in FIG. 3. The oxidizer passage plate 31 is likewise congruent in details with the oxidizer distribution plate 11 (FIG. 8) and with the associated cell components. The passage area 33 is permissible to the flow of oxidizer and is formed by the same means and as part of the oxidizer passage plate.

We have recognized that one advantage of joined or laminated electrodes is the placement of catalysts away from the electrolyte which thereby allows electrons to be added to the forming oxygen ions prior to combining with the fuel ions at the output of the electrolyte and thus increases efficiency through a normal flow to the discharge passage 45. Another advantage of joined or laminated electrodes which we have recognized is the ability to use extremely high volume production equipment such as stamping machines.

FIG. 8 shows in isolation the oxidizer distribution plate 11 which is similar and congruent with the positive electrode assembly of FIG. 5 in substantial detail, including the vias 42, 43, the passages 44, 45, and the structure 47, can be made conductive or nonconductive and may include electrical connecting tabs. The oxidizer distribution plate 11 shown in FIG. 3 is one example which is used in combination with two oxidizer passage plates 31 of the type shown in FIG. 7 to form a complete positive electrode and to be stacked with the associated fuel cell components. In another example shown in FIG. 1, the oxidizer distributor plate 11 is used in combination with a structural solid electrolyte 13 and a fuel distributor plate 12 to form a complete fuel cell. In yet another example shown in FIG. 2, the oxidizer distributor plate 11 is used in combination with a flexible membrane electrode assembly to form a complete fuel cell assembly of the type shown in FIG. 19. The working area 48 can be formed as that of the positive electrode in FIG. 5 or can be removed entirely.

Figure 9:
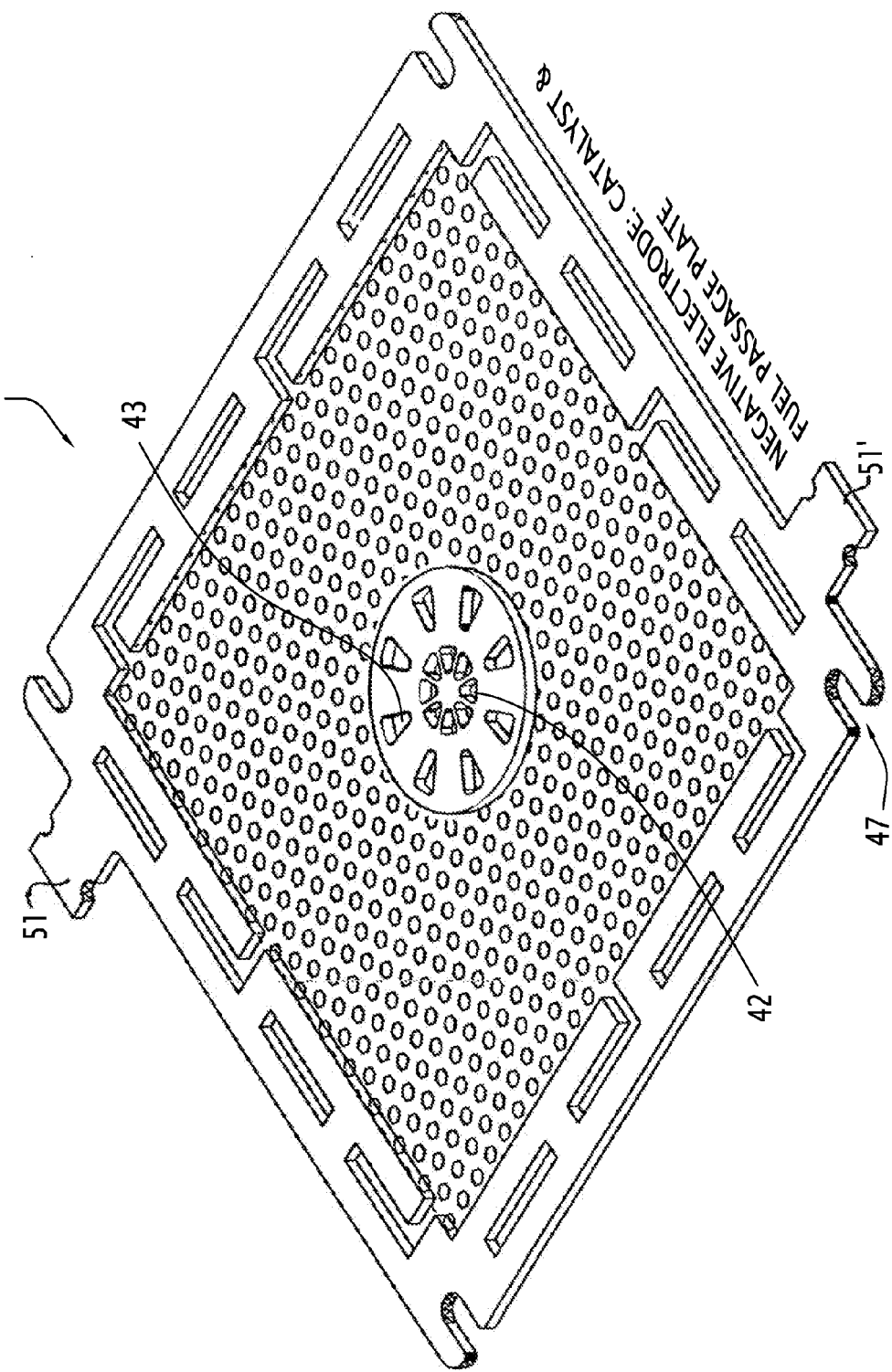
FIG. 9 is a perspective view of a catalyst and fuel passage plate of a multiple part joined or laminated negative electrode assembly for a fuel cell according to the present invention.
Figure 10:
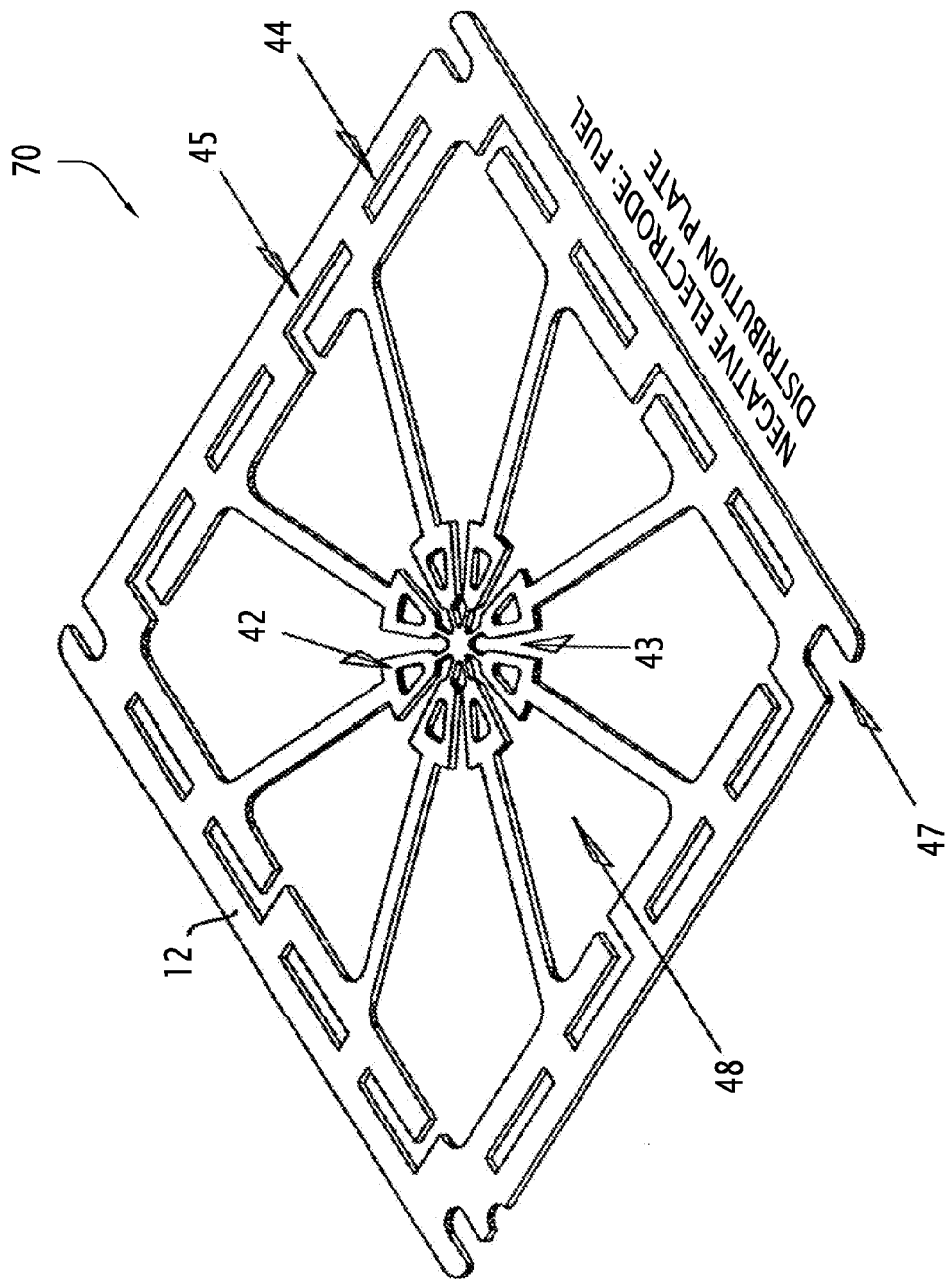
FIG. 10 is a perspective view of a fuel distribution plate shown in FIGS. 1 and 18.

FIG. 9 shows a fuel passage plate designated generally by numeral 60 which is used in combination with the fuel distribution plate designated generally by numeral 70 in FIG. 10 and another fuel passage plate (not individually shown) to form a complete negative electrode. The fuel passage plate 60 is likewise congruent in major details, except for the electrical connecting tabs 51, 51', with the fuel distribution plate 70 so as to form a complete negative electrode of the type seen in FIG. 3 and FIG. 6B and be stacked with the associated cell components. The passage area 48 is permissible to the flow of fuel and formed by the same means and as part of the fuel passage plate.

The above-referenced FIG. 10 shows the fuel distribution plate 70 in isolation. The plate 70 is thus similar and congruent with the negative electrode 50' in FIG. 6B in certain details, can be made conductive or nonconductive, and may include electrical connecting tabs. In one example, the fuel distribution plate 70 is, as above noted, used in combination with two fuel passage plates 60 shown in FIG. 9 to form a complete negative electrode (similar to the electrode assembly of FIG. 3) and can be stacked with the associated cell components to produce the required power. The working area 48 is formed in the manner of the negative electrode 50' (FIG. 6B) or removed entirely. In the example of FIG. 1, the fuel distribution plate 12 is used in combination with the rigid solid electrolyte 13 and an oxidizer distributor plate 11 to form a complete fuel cell. The fuel distribution plate can also be stacked with a flexible membrane electrode assembly of the type shown in FIG. 2 to form a fuel cell assembly of the type shown in FIG. 19.

Figure 11:
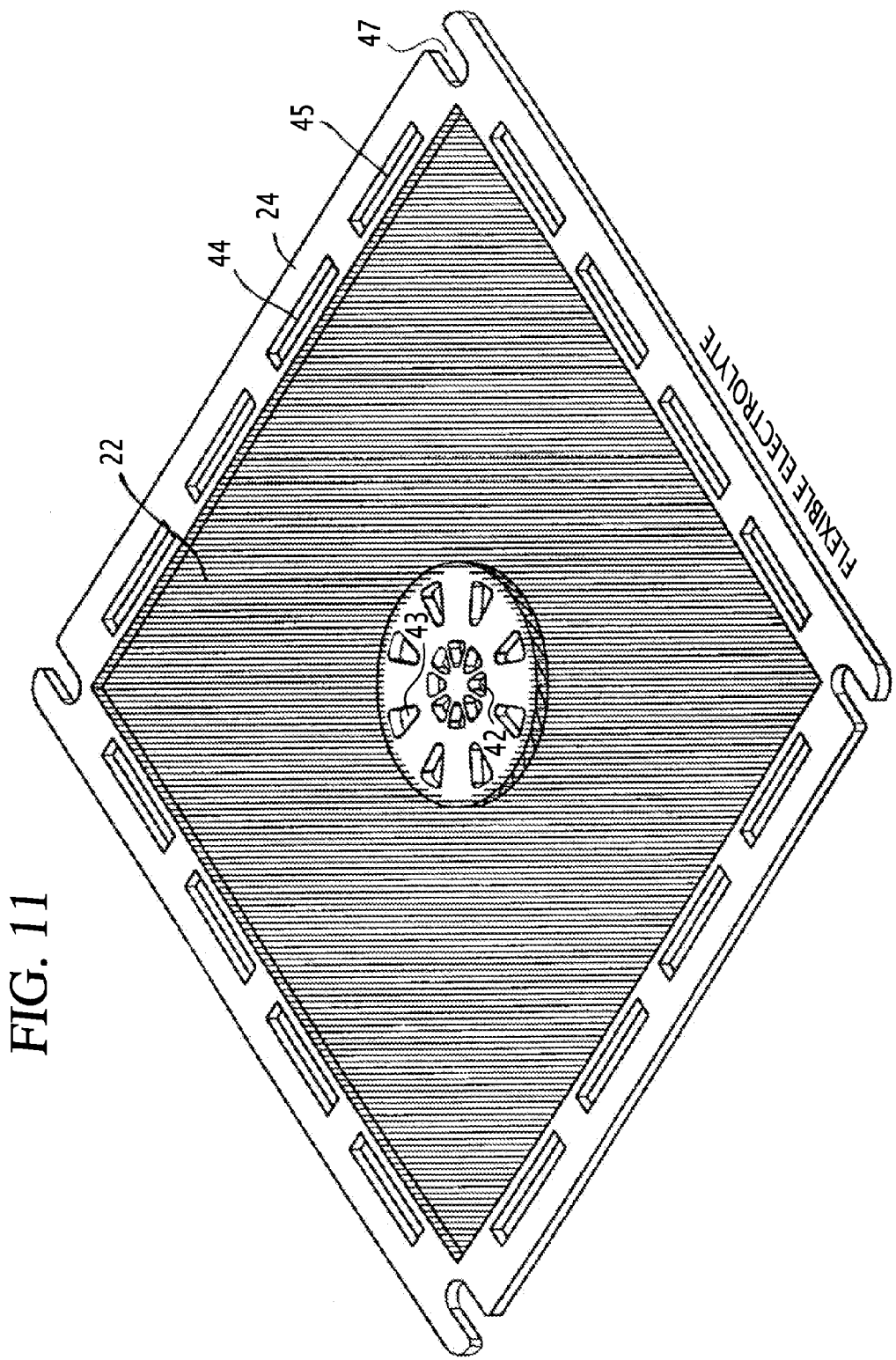
FIG. 11 is a perspective view of a flexible electrolyte used in a fuel cell of the type shown in FIGS. 2 and 19.

FIG. 11 shows in isolation the already discussed flexible electrolyte 22 which is likewise congruent in significant details 15 with the associated cell electrodes, e.g. 30, 40, 50, 100 to allow the individual components to be stacked to form a fuel cell of the desired power output. The flexible electrolyte 22 is in fact permissible (i.e. permitting passage) to migrating ions and must be physically supported by a structural frame 24 or attachment to an electrode. The advantage of the flexible electrolyte used in the present invention is that it is already a commercially available product.

Figure 12:
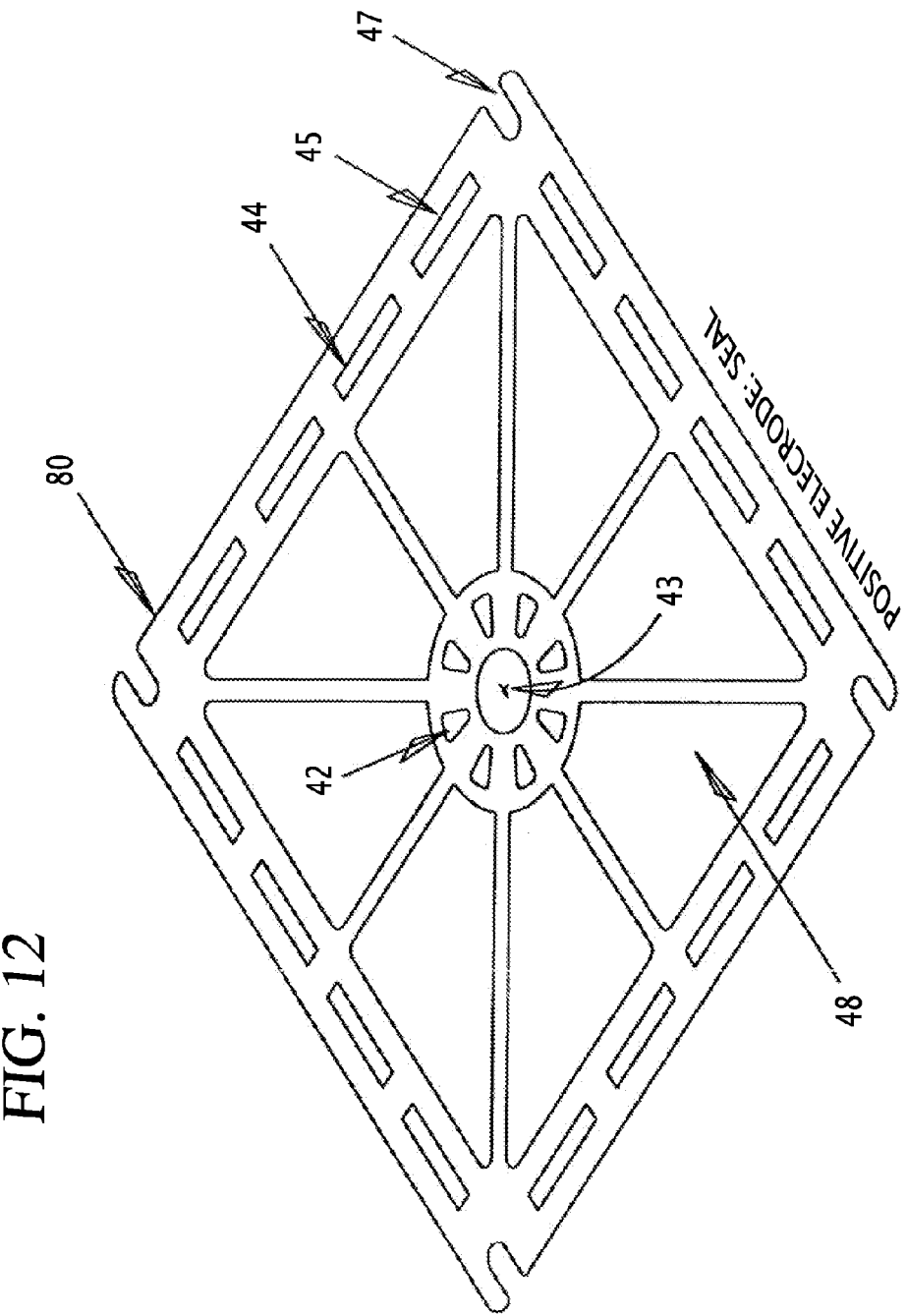
FIG. 12 is a perspective view of a positive electrode cut or formed seal used between cell components in lieu of fixed joinery of a fuel cell utilizing the principles of the present invention.

FIG. 12 shows in isolation a positive electrode cut or formed seal designated generally by numeral 80 which may be used between the positive electrode 30, 40, 100 and the flexible electrolyte 22 to form an alternative electrical separation and closure therebetween. This electrode seal is important when used with cell components which are readily damaged or of low electrical resistance, either of which condition might cause fuel cell failure. The positive electrode seal 80 is likewise congruent in significant details to stack and seal the associated cell components.

Figure 13:
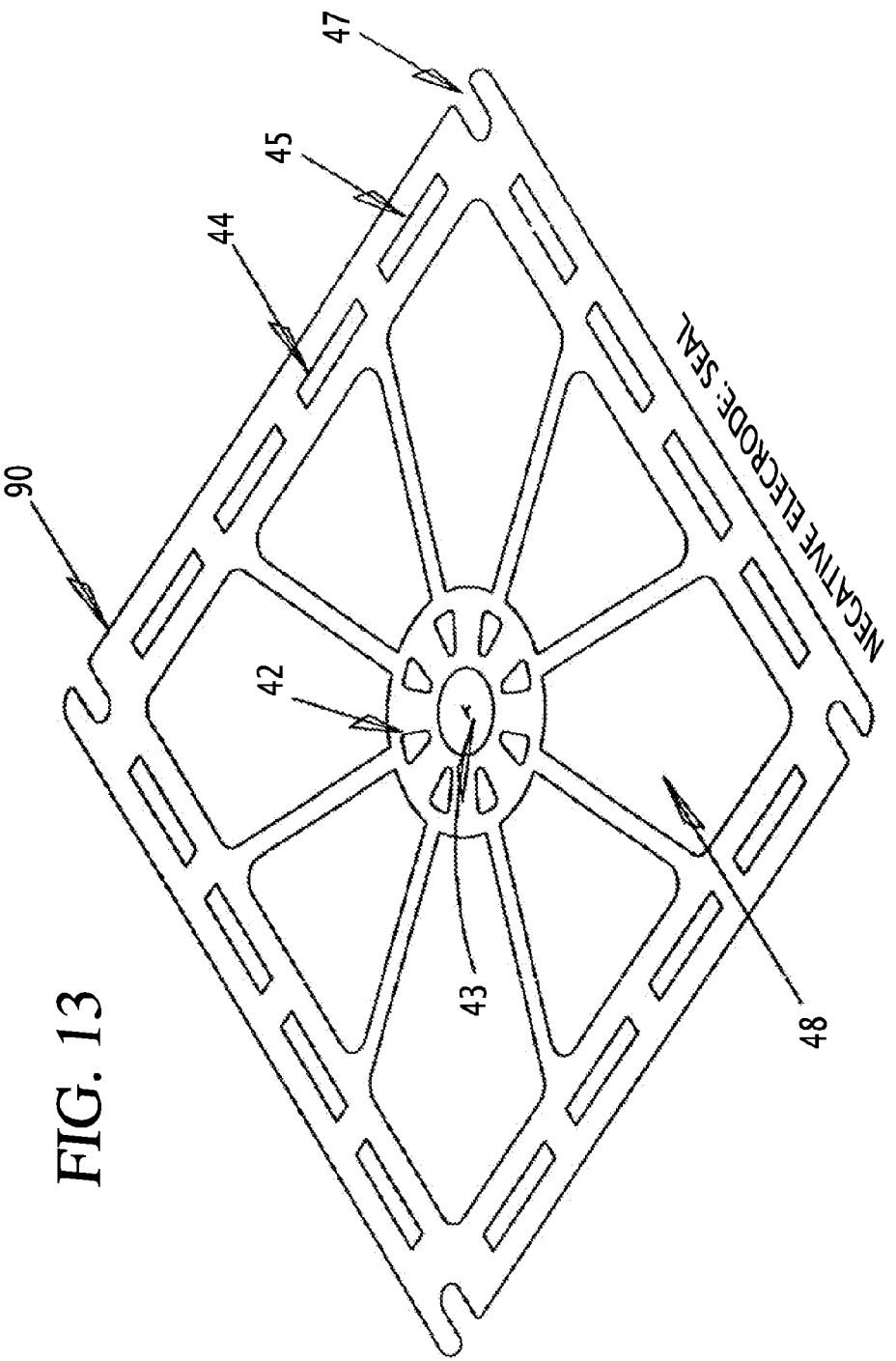
FIG. 13 is a perspective view of a negative electrode cut or formed seal used between fuel cell components in lieu of fixed joinery of the cell.

FIG. 13 shows in isolation a negative electrode cut or formed seal 90, which can be, for example, used between the negative electrode 50' (FIG. 6B) and the flexible electrolyte 22 to form an alternative electrical separation and closure therebetween. The electrode seal is also significant here when used with cell components which are readily damaged or of low electrical resistance, either of which condition might cause fuel cell failure. The negative electrode seal is also congruent in details to stack and seal the associated cell components.

Figure 14:
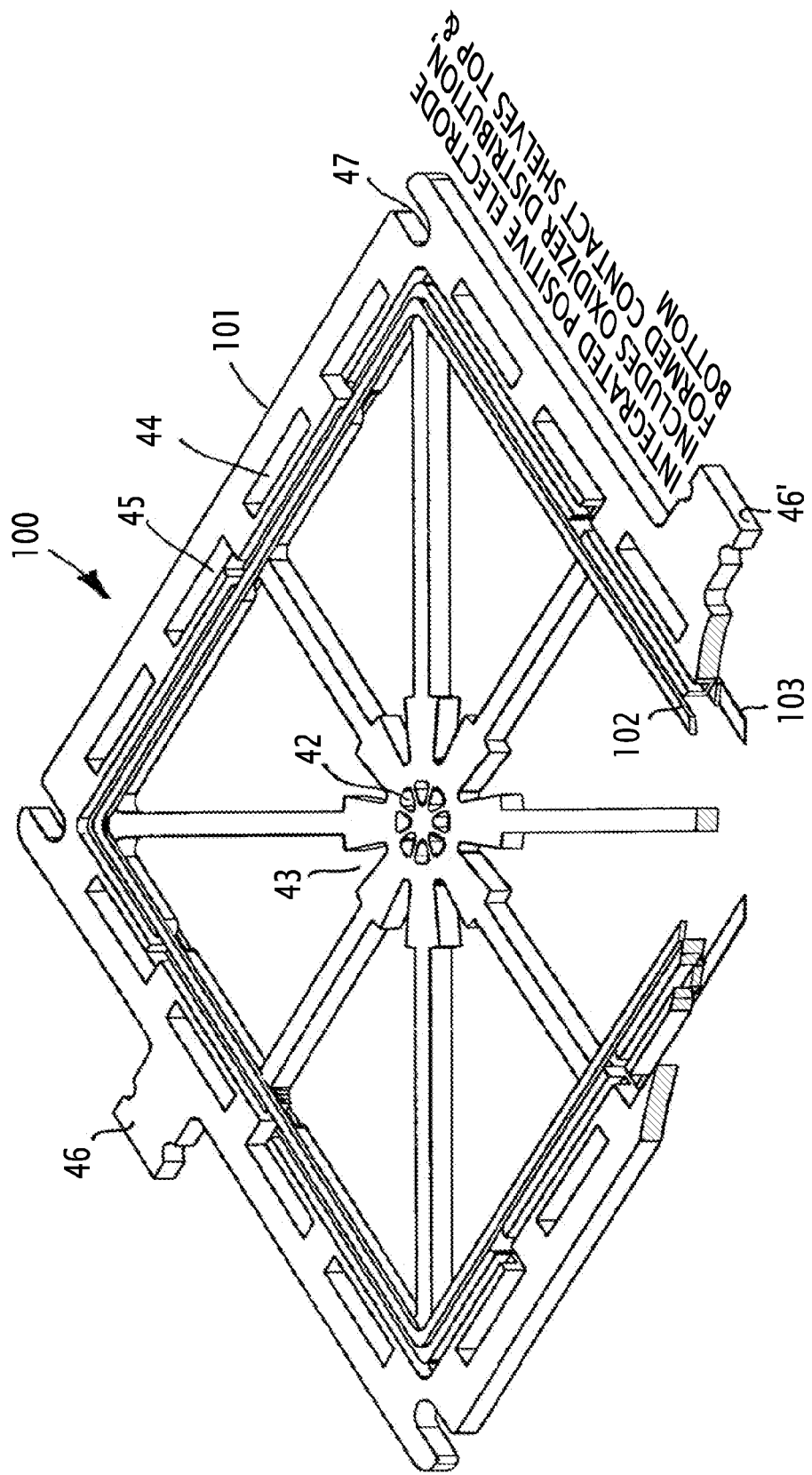
FIG. 14 is a perspective view of one of the cell positive (or negative) electrodes which incorporates oxidizer distribution and formed contact top and bottom shelves for a fuel cell constructed according to this invention.

FIG. 14 also exemplifies the method and process flexibility embodied in the "unit" approach of the present invention by describing one of the cell electrodes, specifically a positive electrode 100. The electrode plate 100 is produced as a single piece by stamping, molding or casting with a solid surround and seal area 101. The plate 100 includes the vias or conduits 42, 43 for the plate-to-plate passage of fuel and oxidizer, respectively, as well as the oxidizer inlet to the cell. Also included in the plate 100 are fuel vias 44, and exhaust vias 45 for plate-to-plate passages and openings to the oxidizer exhaust vias. The electrical connecting tabs 46, 46' are integral to the plate 100 and require no additional work. The previously-described alignment, assembly and clamp structure 47 included in the electrode plate 100 further reduces complexity and produces a strong structure for the associated cell. The largest area of the plate is dedicated to the distribution of the oxidizer to the electrolyte 22. Contact shelves 102, 103 for assuring good mechanical/electrical contact to assure edge collection of current are produced as part of the plate 100 by stamping corrugations or ribs top and bottom or by molding or casting the plate with such nesting ribs. The plate 100 can be produced from conductive materials to reduce the number of process steps or from non-conductive materials to which conductive materials are applied by coating, printing, plating, sputtering or other conventional techniques, again reducing material costs. The entire working surface may be overlaid with the catalyst by coating, printing, plating, sputtering or other techniques. The surface where the components are to be attached to one another can be prepared by printing, selective coating, selective plating or the like for joining by brazing, eutectic wetting, plate bonding or other known ways. The positive electrode 100 may be stacked with a solid electrolyte and a similar negative electrode with contact shelves to form a complete fuel cell. The electrodes are configured to have electrolytes on either side thereof as shown in FIG. 19.

Figure 15:
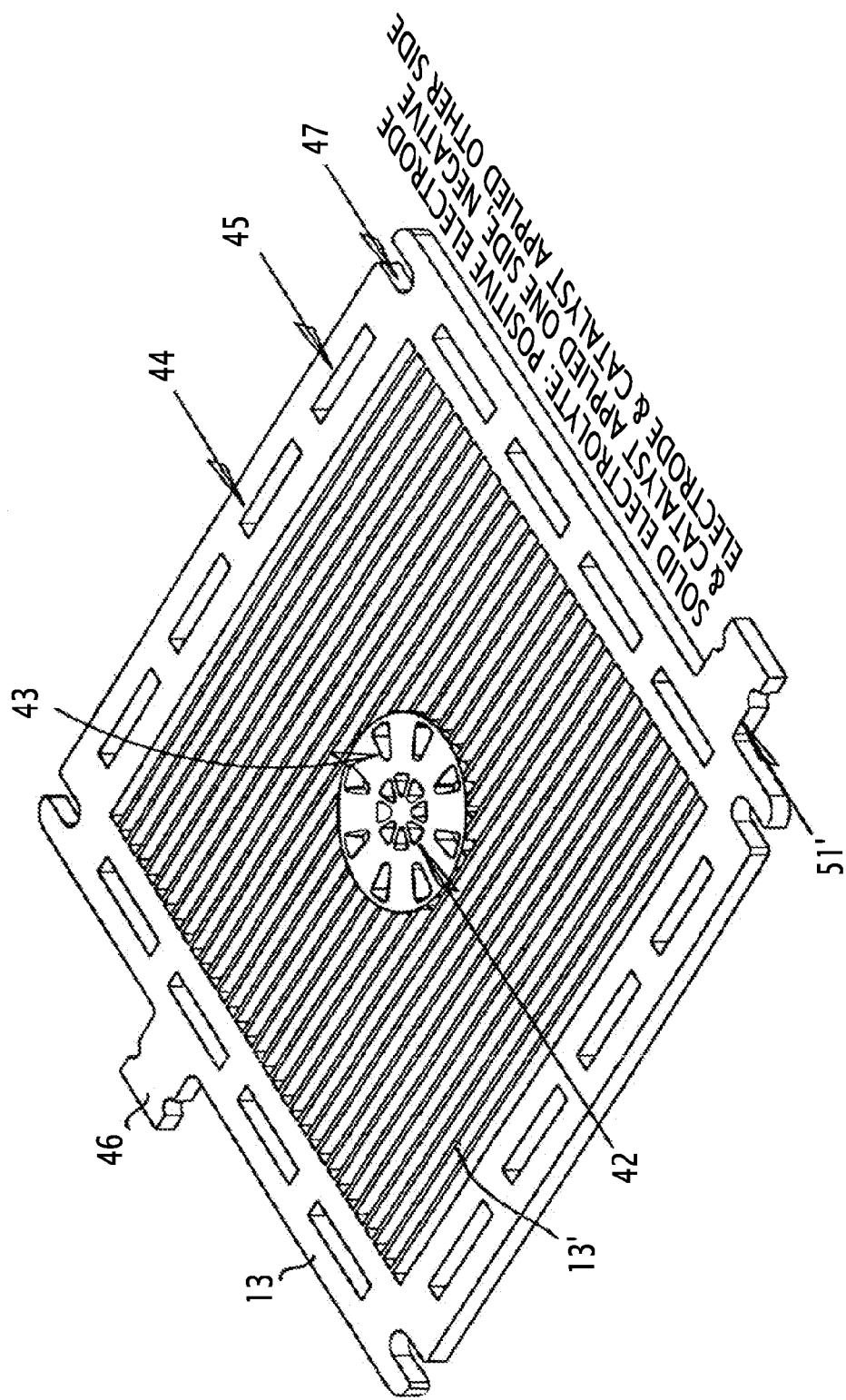
FIG. 15 is an isolated perspective view of a solid electrolyte used in a fuel cell of FIG. 1.

FIG. 15 shows the rigid, structural solid electrolyte 13, also shown in FIG. 1, which is produced from a single piece of inert structural material and configured such that the main structural component is a peripheral surround of the processing area which is impermeable, includes electrical connecting tabs, and provides an attachment and seal or closure area. Seal areas are also provided at strategic internal locations for inter-cell fluid passages. The large operating area 13' of the electrolyte is processed to allow passage of the appropriate ions (migrating ions) and provides attachment surfaces for conductive materials and the appropriate catalysts such that one side of the rigid electrolyte contains a negative electrode, and another side contains a positive electrode, so as to form a single inclusive unit, i.e., electrolyte, and positive and negative electrodes. This unit is congruent in significant details (e.g., fuel and oxidizer vias 42, 43; return and exhaust passages 44, 45; alignment assemble and clamp structure 47) with the associated non-conductive distribution plates (FIG. 1), which allows the individual components to be stacked to accomplish a complete fuel cell.

Figure 16:
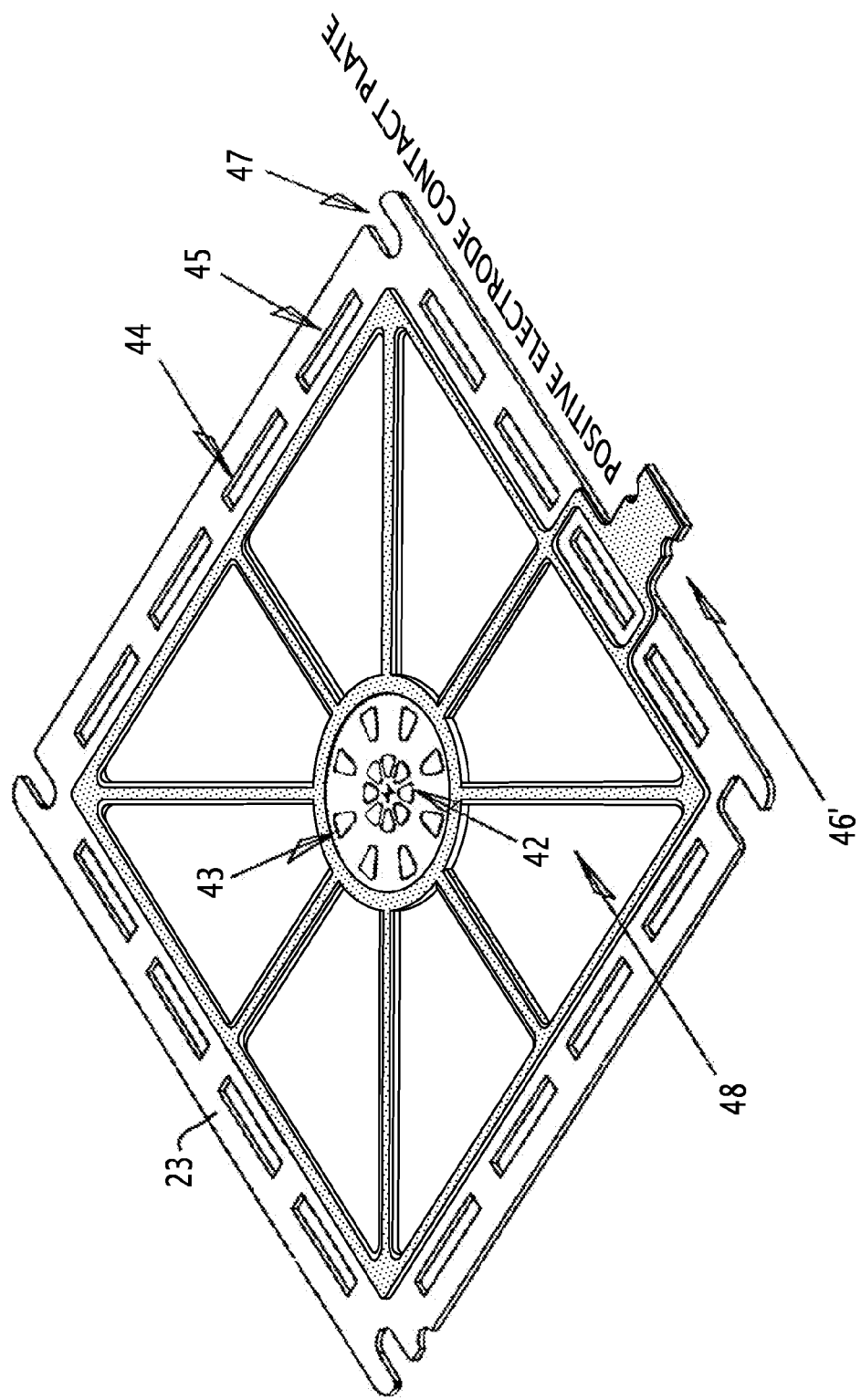
FIG. 16 is a perspective view of a formed non-conductive structural electrode contact plate used in a fuel cell of the type shown in FIG. 2, to which is applied a conductive material in those areas which provide external connection and which come in contact with an electrolyte previously prepared with conductive catalysts applied to each side.
Figure 17:
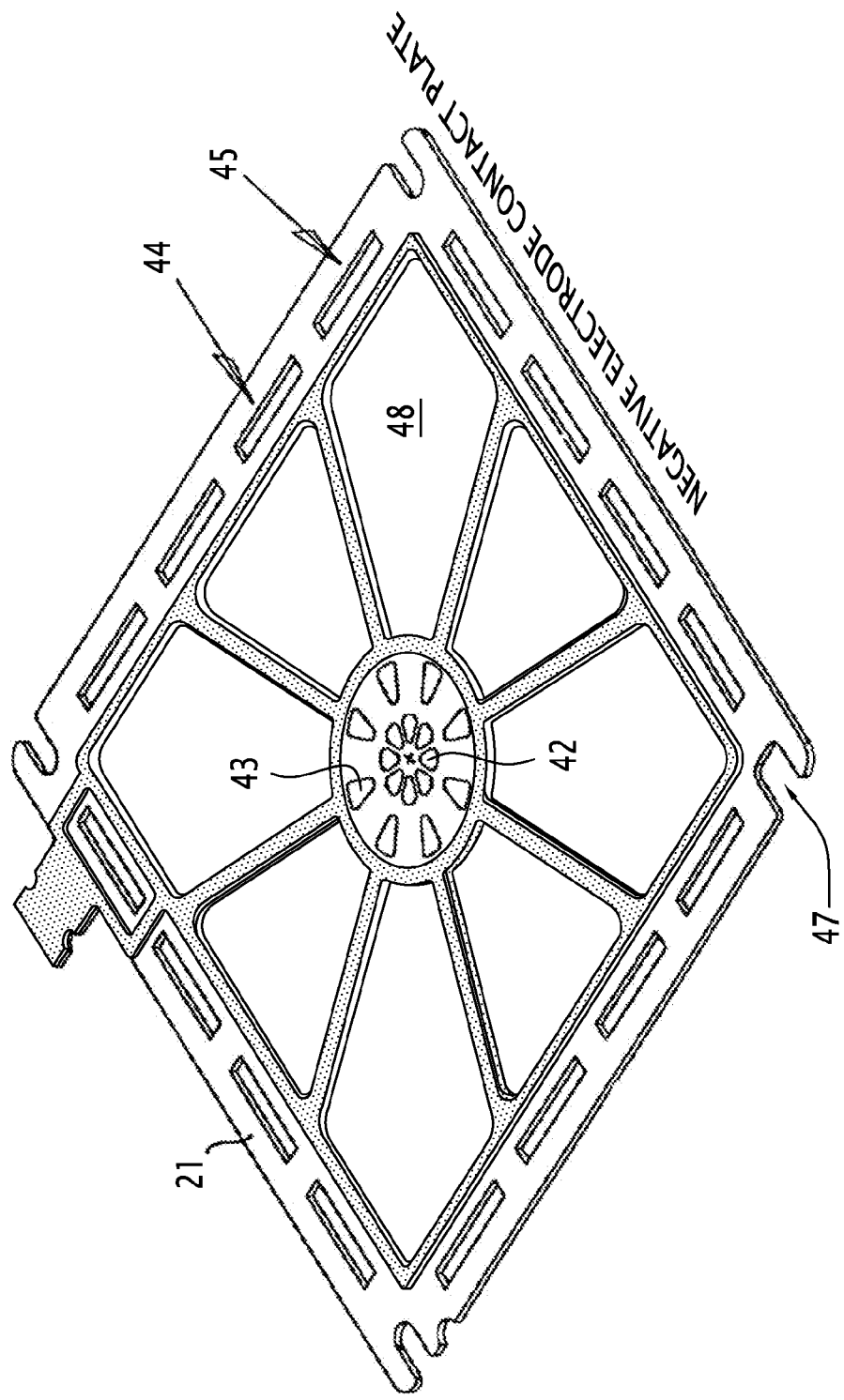
FIG. 17 is a perspective view of a formed non-conductive structural electrode contact plate to which is applied a conductive material in those areas which provide external connection and which come in contact with an electrolyte previously prepared with conductive catalysts applied to each side used, for example, in the fuel cell of FIG. 2.

FIGS. 16 and 17, respectively, show the positive and negative electrode contact plates. The plates are made of dielectric (nonconductive) material such as glass, ceramic synthetic resin, etc. to which is applied a described conductive surface, etched or cut foil, ink etc. These plates are then assembled with a solid electrolyte and with the similar material distribution plates, separators, etc. to form a complete cell. A laminating process similar to that used in multi-layer printed circuit board production may be employed.

Figure 18:
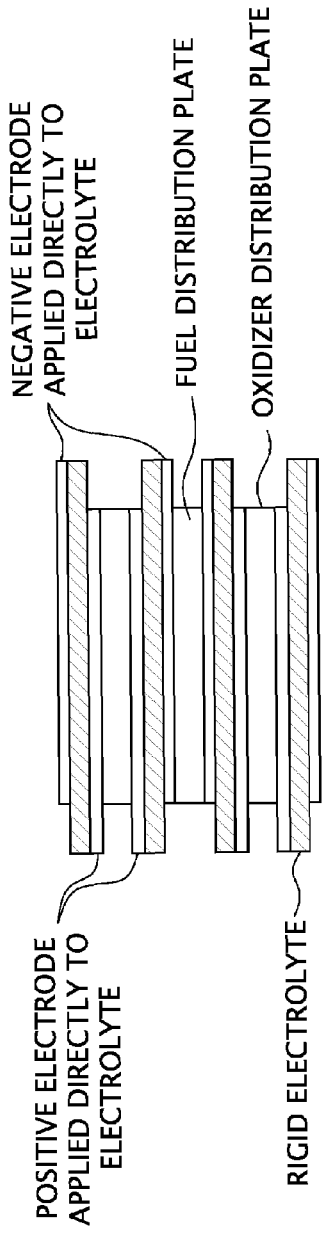
FIG. 18 is an elevational view of a fuel cell stack assembly utilizing a rigid electrolyte system, also known as a rigid electrolyte stack, in accordance with the present invention.

In the rigid electrolyte stack shown in FIG. 18, the fuel cells shown in FIG. 1 are solid oxide fuel cells assembled into a stack. The positive and negative electrodes are applied directly to opposite sides of the rigid electrolyte, and the fuel and oxidizer distribution plates are alternately arranged between the positive and negative electrode sides of the electrolytes so that the positive electrode sides of two opposing electrolytes share an oxidizer distribution plate, and conversely the negative electrode sides of two opposing electrolytes share a duel distribution plate. FIG. 19 shows a flexible electrolyte fuel cell stack using a flexible cell assembly of the type shown in FIG. 2. Alternatively, similar stacks can be made by the alternate assembly of flexible electrolytes with the double sided positive and negative electrodes or electrode assemblies of the types seen in FIGS. 3, 5, 6A, 6B, and 14, so that the positive sides of two opposing electrolytes share a positive electrode, and conversely the negative sides of two opposing electrolytes share a negative electrode. The positive electrode has internal oxidizer distribution, and the negative electrode has internal fuel distribution. The flexible electrolyte (PEM) can be held in a frame or supported by the electrode plate as seen in FIG. 2 or FIG. 11. It is to be understood that the stacks shown in FIGS. 18 and 19 are only portions or segments of a complete stack which can number several hundred fuel cell assemblies. Conventional end caps (not shown) are also put at the terminal sides of the completed stack.

Figure 20:
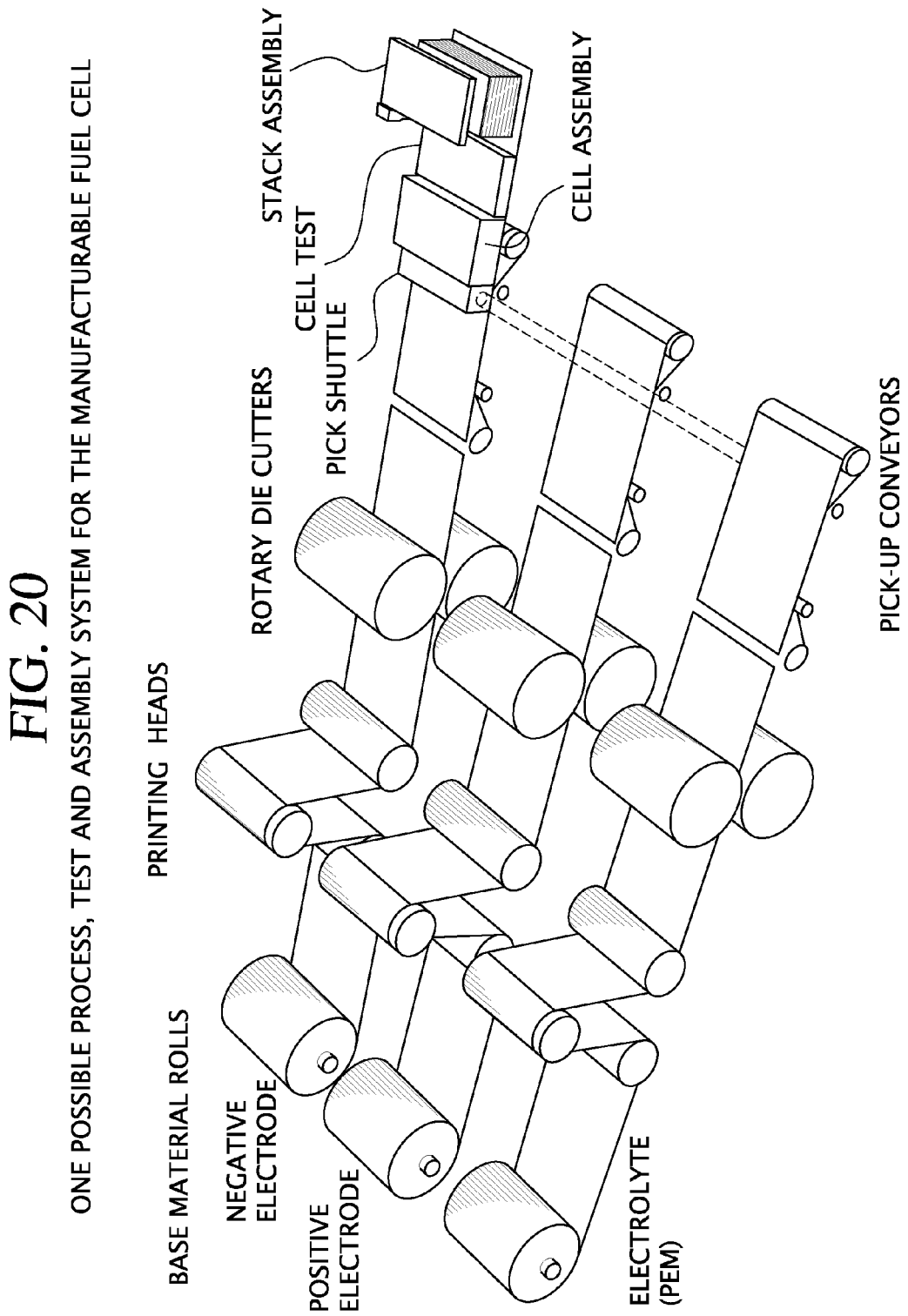
FIG. 20 is a schematic perspective view of an assembly line for processing, testing and assembling a fuel cell in accordance with the present invention.

FIG. 20 shows one possible process, test and assembly system for producing the aforementioned fuel cells in a simple, efficient and economical manner in accordance with the present invention. In particular, the PEM, positive electrode and negative electrode substrates are unrolled from large rolls of basic material and passed through printing heads in which the positive and negative catalysts are printed thereon. The printed substrates are then passed through conventional rotary die cutters where they are cut to the appropriate fuel cell size and picked up by conveyors. Conventional conveying technology is utilized to bring the electrolyte between the positive and negative electrodes of the general type shown in FIGS. 2 and 11. The cell assemblies are then picked by a pick shuttle and forwarded to a cell test device prior to assembly into the stack.

Figure 21:
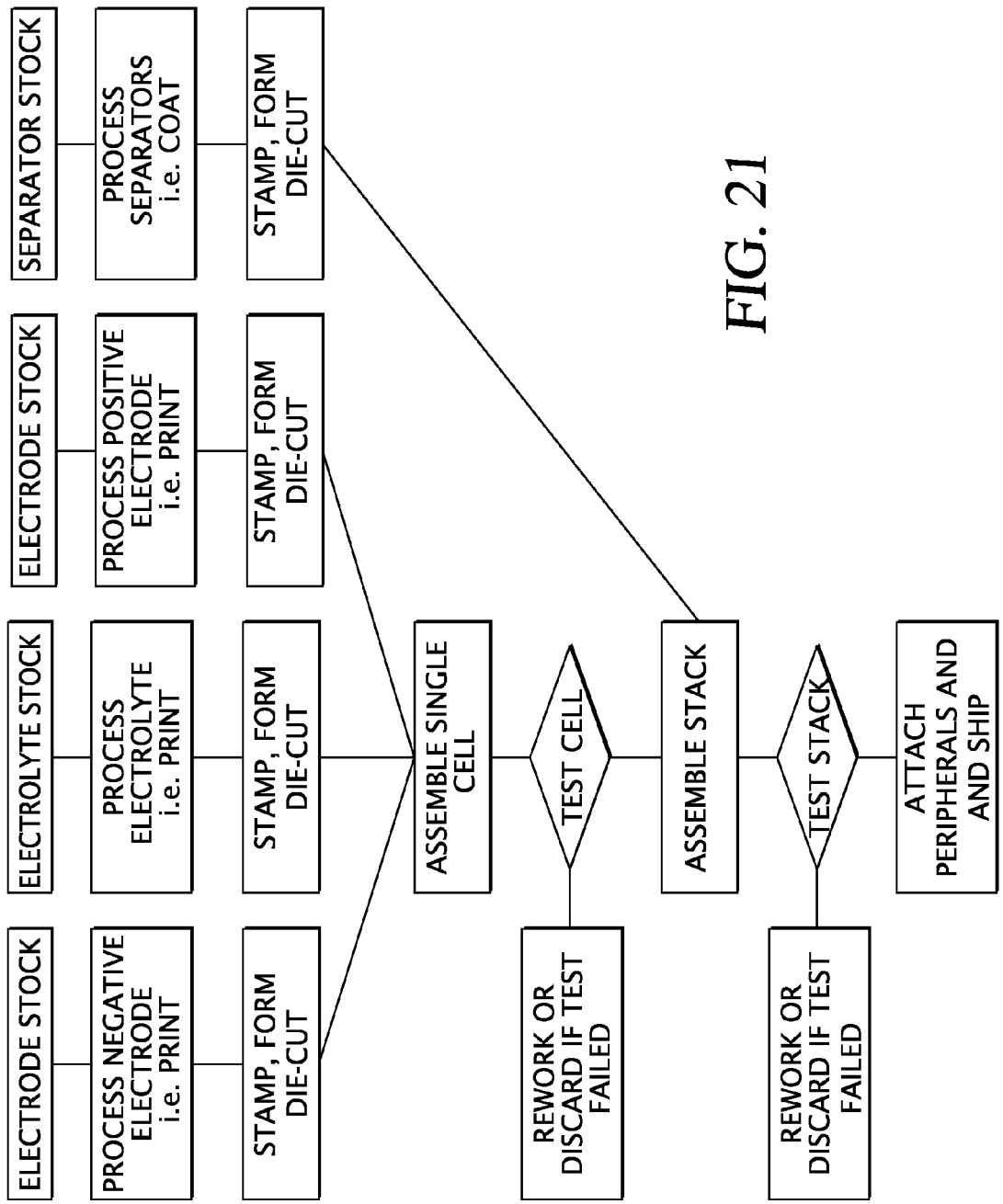
FIG. 21 is a flow chart showing the basic steps of manufacturing process in accordance with the present invention to achieve economical fuel cell products.
Figure 22:
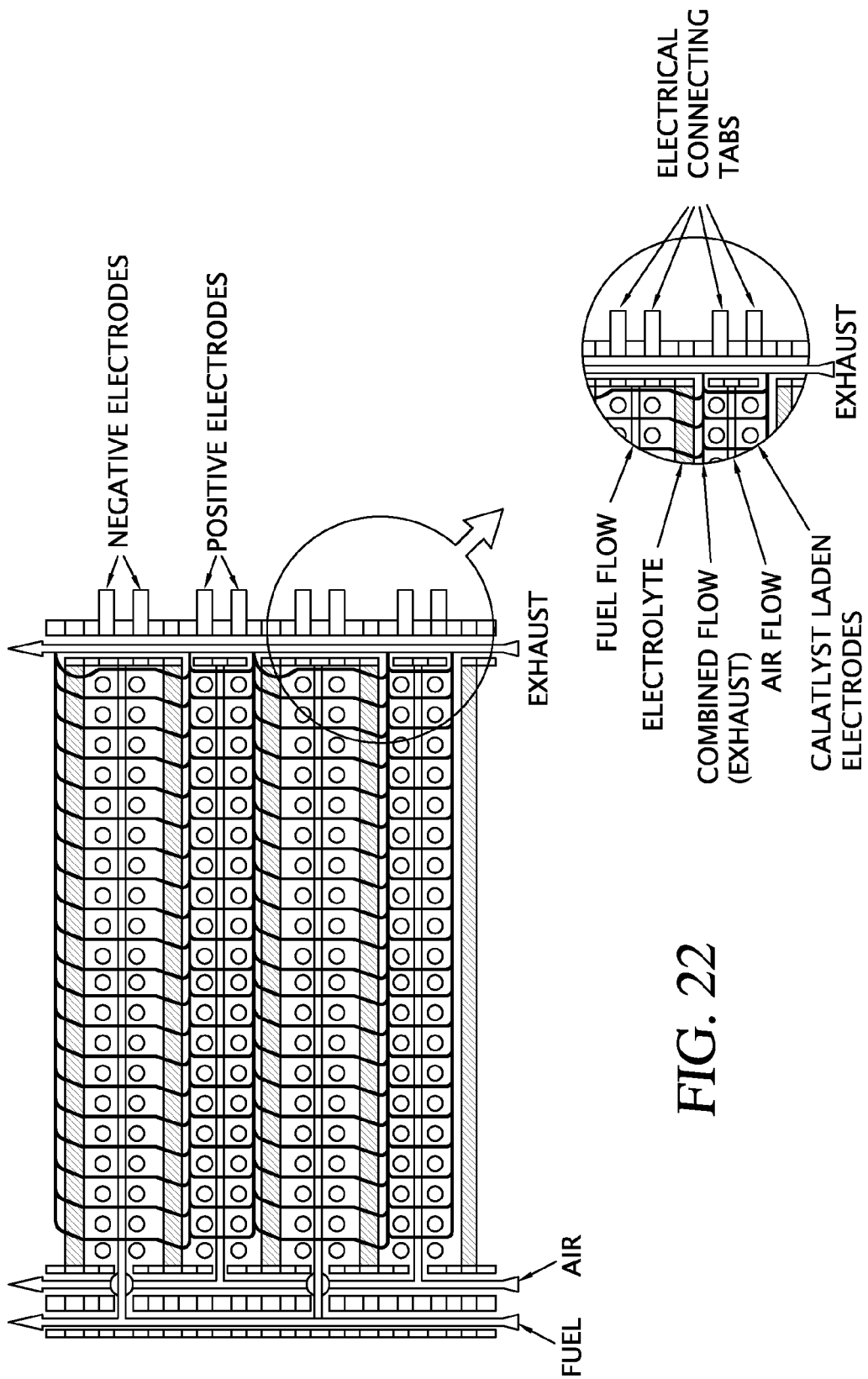
FIG. 22 is a schematic view of a portion of a fuel cell stack of the type shown in FIG. 18 showing in isolation a part thereof to illustrate routing of the fuel, oxidizer and exhaust therethrough.

This process is also shown in the flow chart of FIG. 21 which also shows the preparation of separators used in the fuel cell stack, the testing of the stack after assembly and the attachment of peripherals to acceptable or reworked stacks. It will, of course, be understood that the electrolyte and electrodes can come from stock material other than rolls. FIG. 22 illustrates the basic flow of fuel, air and exhaust in a typical fuel cell system manufactured in the above-described manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fuel cell comprising
    fuel distribution plate,
    an oxidizer distribution plate, and
    a solid electrolyte operatively arranged between the fuel distribution plate and the oxidizer distribution plate,
    wherein the solid electrolyte comprises a frame with a central portion having a positive electrode and catalyst applied on one side of the central portion and a negative electrode and catalyst on a side of the central portion opposed to the one side, fuel and oxidizer vias arranged centrally of the frame, fuel, and exhaust conducts arranged in the frame and electrical contact lugs extending in a direction outwardly of the frame.

2. The fuel cell according to claim 1, wherein the oxidizer distribution plate is arranged on the positive electrode side of the solid electrolyte and comprises an outer frame having alternately arranged fuel conduits and exhaust conduits therein congruent with the fuel and exhaust conduits of the solid electrolyte frame, fuel, and oxidizer vias congruent with solid electrolyte vias, and a plurality of members extending between the frame and the vias to define permissible areas for the oxidizer.

3. The fuel cell according to claim 1, wherein the fuel distribution plate is arranged on the negative electrode side of the central portion and comprises an outer frame having alternately arranged fuel conduits and exhaust conduits therein congruent with the fuel and exhaust conduits of the solid electrolyte frame, fuel and oxidizer vias congruent with solid electrolyte vias, and a plurality of members extending between the frame and the vias to define permissible areas for the fuel.

4. The fuel cell according to claim 3, wherein the oxidizer distribution plate is arranged on the positive electrode side of the solid electrolyte and comprises an outer frame having alternately arranged fuel conduits and exhaust conduits therein congruent with the fuel and exhaust conduits of the solid electrolyte frame, fuel and oxidizer vias congruent with solid electrolyte vias, and a plurality of members extending between the frame and the vias to define permissible areas for the oxidizer.

5. The fuel cell according to claim 1, wherein the fuel and oxidizer vias are arranged in a radially extending pattern in substantially the same plane.

6. The fuel cell according to claim 5, wherein the vias are defined by integral structure of the distribution plates and solid electrolyte.

7. The fuel cell according to claim 5, wherein the radially extending vias are concentrically arranged.

8. The fuel cell according to claim 4, wherein the exhaust conduits in the frames of the fuel distribution plate and the oxidizer distribution plate are open at inner sides of the frames to communicate with the permissible areas which constitute a major portion of the area of the plates inside their respective frames.

9. The fuel cell according to claim 1, wherein the fuel distribution plate, the oxidizer distribution plate and the solid electrolyte are so configured as to provide a flexible or rigid electrolyte fuel cell construction.

10. A fuel cell, comprising components which include:
    (a) a fuel distributor,
    (b) an oxidizer distributor, and
    (c) a solid electrolyte operatively arranged between the fuel distributor and the oxidizer distributor, wherein each of the components (a), (b) and (c), and subassemblies thereof, are configured so as to be stackable to form a solid electrolyte fuel cell in which said components and subassemblies thereof constitute an alignable, sealable, modular structure with internal fuel feed passages, fuel distribution passages, oxidizer feed passages, oxidizer distribution passages, return passages, and exhaust passages contained in the modular structure and with electrical connection tabs accessible externally of the modular structure.

11. The fuel cell according to claim 10, wherein said components are internally configured to provide the fuel feed passages, the fuel distribution passages, the oxidizer feed passages, the oxidizer distribution passages, the return passages and the exhaust passages.

12. The fuel cell according to claim 10, wherein said components are formable into one of a single fuel cell, a fuel cell module, and a fuel cell stack with end components located at each end of a completed cell stack, and the end components being internally configured to connect the fuel feed passages, the oxidizer feed passages, the return passages and the exhaust passages to corresponding external fittings and having compressive connection means for connecting between closure pieces and the remainder of the fuel cell assembly.

13. The fuel cell according to claim 12, wherein the fuel distribution plate is arranged on the opposed side of the central portion and has alternately arranged fuel conduits and exhaust conduits therein congruent with the fuel and exhaust conduits of the solid electrolyte, fuel and oxidizer vias congruent with the solid electrolyte vias, and a plurality of members defining permissible areas for the fuel, said fuel distribution plate serving as a structural support and as an electrical interconnect for the fuel side of the solid electrolyte, incorporating electrical contact lugs extending outwardly from the outer frame thereof.

14. The fuel cell according to claim 10, wherein the oxidizer distribution plate is arranged on one side of the solid electrolyte and comprises an outer frame having alternately arranged fuel conduits and exhaust conduits therein congruent with the fuel and exhaust conduits of the solid electrolyte frame, fuel and oxidizer vias congruent with the solid electrolyte vias, and a plurality of members extending between the frame and the vias to define permissible areas for the oxidizer.

15. The fuel cell according to claim 10, wherein the fuel distribution plate is arranged on an opposite side of the central portion and comprises an outer frame having alternately arranged fuel conduits and exhaust conduits therein congruent with the fuel and exhaust conduits of the solid electrolyte frame, fuel and oxidizer vias congruent with the solid electrolyte vias, and a plurality of members extending between the frame and the vias to define permissible areas for the fuel.

16. The fuel cell according to claim 10, wherein a nonconductive seal and closure member is arranged between and substantially congruent with adjoining fuel cell components or fuel cell component assemblies to obtain alternative electrical separation and enclosure.

17. The fuel cell according to claim 10, wherein the solid electrolyte, electrode, distribution plates and assemblies thereof are configured such that a fuel side of one electrolyte is arranged to face a fuel side of a succeeding electrolyte, thereby enabling use of one common fuel distribution plate or one common fuel distribution assembly independently of whether the negative electrodes are at fuel sides of the facing electrolytes, to the common fuel distribution plate or to the common fuel distribution assembly, and further wherein the oxidizer side of one electrolyte is configured to face the oxidizer side of a succeeding electrolyte, thereby enabling use of one common oxidizer distribution plate or one common oxidizer distribution assembly independently of whether the positive electrodes are applied to the oxidizer sides of the facing electrolytes, or to the common oxidizer distribution plate or to the common oxidizer distribution assembly and thus reducing size and weight of a complete fuel stack.

18. The fuel cell according to claim 10, wherein the electrodes, and electrode-containing and conductive components and component assemblies incorporate externally selectable and connectable electrical tabs which extend outwardly of the component frames are positioned and configured as to always uniquely identify a negative and a positive, and are congruent with like contact tabs of adjoining cell components and cells, thus enabling externally directed edge conductive current collection which eliminates internal cell-to-cell electrical contact with resultant thermal, resistive, corrosive failures, and bipolar separators.

19. The fuel cell according to claim 17, wherein common anode and cathode plenums and externally selectable and connectable edge current collection tabs can be configured to provide electrical connectability every two cells in series, thereby effectively doubling as an active stack area, with at least two-cell building blocks being configured as modular, replaceable units.

20. The fuel cell according to claim 10, wherein the electrical connection tabs are configured to allow individual cells or cell modules within a fuel cell stack to be tested in operation and on line, and to provide a multiplicity of power configurations.

21. The fuel cell according to claim 10, wherein the oxidizer and fuel distribution plates, fuel and oxidizer vias arranged centrally of the frame, fuel return and exhaust conduits arranged peripherally in the frame and a plurality of members extending radially between the vias and frame, are configured to facilitate fluid flow for desired surface distribution, fuel utilization and removal of increased exhaust fluid volume without the use of air compressors and fuel expanders.

22. The fuel cell according to claim 10, further comprising fuel and air feeds which have a co-annular arrangement.

23. The fuel cell according to claim 10, further comprising fuel and air feeds which are offsettable from one another along an axis to selectively obtain desired separation between fuel and oxidizer.

24. The fuel cell according to claim 10, further comprising a fuel re-circulation loop configured to act as a heat transfer medium, with excess cathode flow being used for heat removal.

25. The fuel cell according to claim 10, wherein the electrolytes are thin, nonstructural polymer members not requiring auxiliary humidification.

26. The fuel cell according to claim 10, wherein the passages, enclosures and vias are simultaneously closed or sealed.

27. The fuel cell according to claim 10, wherein the components are configured to be reversible.

28. The fuel cell according to claim 10, wherein the components are provided with means for alignment thereof.

29. The fuel cell according to claim 10, wherein said components (a), (b) and (c) are configured to incorporate therein features which include internal fuel, oxidizer and exhaust passages, fuel return passages as required, alignment and interlock guides and externally extending electrical connection tabs.

30. The fuel cell according to claim 10, wherein said components (a), (b) and (c) are configured to be congruent with each other to form a complete, alignable, repeatable solid electrolyte fuel cell with internally located, integrated vias and ports for plate-to-plate and inter-cell fuel, oxidizer and exhaust passages, and electrical connection tabs extending outwardly from said fuel cell, to provide for selective external electrical connection of the stacked cells for a desired electrical output.

31. The fuel cell according to claim 10, wherein the fuel, oxidizer and exhaust passages are internally configured in and formed by said components (a), (b) and (c) so that when said components (a), (b) and (c) are aligned and stacked to form a complete cell and stacks of cells, passages of adjoining components and adjoining cells are congruent and form integrated plate-on-plate and cell-to-cell corresponding passages.

32. The fuel cell according to claim 10, wherein said components (a), (b) and (c) are configured to be assemble into a complete single cell, whereby a plurality of such single cells is formable into a cell stack having end components closure pieces congruent with adjacent cell components and configured to connect the internal fuel, oxidizer and exhaust passages to corresponding singular external fittings, and including means for compressively connecting between closure pieces and the remainder of the fuel cell assembly.

33. The fuel cell according to claim 10, wherein the solid electrolyte incorporates a negative electrode on a one side facing the fuel distributor, and a positive electrode on an opposed side facing the oxidizer distributor to provide a single inclusive unit consisting of solid electrolyte and positive and negative electrodes, externally extending electrical connection tabs are incorporated with the fuel and oxidizer passages constituting means for internal plate-to-plate and cell-to-cell passage of fuel and oxidizer, exhaust vias for internal plate-to-plate and cell-to-cell passage of exhausted product, and alignment and interlock guides, with the fuel distributor and the oxidizer distributor being non-conductive and incorporating fuel, oxidizer and exhaust vias congruent with the corresponding solid electrolyte vias, fuel and oxidizer inlets to the cell, defined permissible areas for distribution of fuel and oxidizer respectively to the electrolyte, and the alignment and interlock guides and optional externally extending non-conductive tabs being congruent with corresponding features of the solid electrolyte.

34. The fuel cell according to claim 10, wherein the oxidizer distributor incorporates positive electrode material to provide a positive electrode with internal oxidizer distribution, thereby serving as a structural support and as an unitized distribution plate and electrode with external electrical connection for an oxidizer side of the solid electrolyte, said oxidizer distributor with electrode incorporating integral externally extending electrical connection tabs, fuel and oxidizer vias for the internal plate-to-plate and cell-to-cell passage of exhausted product, and a defined working area for distribution of the oxidizer to the electrolyte, and the oxidizer distributor constituting a single plate made of one of non-conductive material with electrode material applied to both sides, and entirely of conductive metal.

35. The fuel cell according to claim 10, wherein the fuel distributor incorporates negative electrode material to provide a negative electrode with internal fuel distribution, thereby serving as a structural support and as an unitized distribution plate and electrode with external electrical connection for a fuel side of the solid electrolyte, said fuel distributor with electrode incorporating integral externally extending electrical connection tabs, fuel and oxidizer vias for the internal plate-to-plate and cell-to-cell passage of fuel and oxidizer, fuel inlet to the cell, exhaust vias for the internal plate-to-plate and cell-to-cell passage of exhausted product, optional internal fuel return passages for return of hydrogen-rich fuel to the source, and a defined working area for distribution of the fuel to the electrolyte, the fuel distributor constituting a single plate made of one of non-conductive material with electrode material applied to both sides, and entirely of non-conductive material.

* * * * *